(12) United States Patent
Patil et al.

(10) Patent No.: US 11,381,999 B2
(45) Date of Patent: Jul. 5, 2022

(54) MULTI-LINK AGGREGATION LINK MANAGEMENT

(71) Applicant: QUALCOMM Incorporated, San Diego, CA (US)

(72) Inventors: Abhishek Pramod Patil, San Diego, CA (US); George Cherian, San Diego, CA (US); Sai Yiu Duncan Ho, San Diego, CA (US); Alfred Asterjadhi, San Diego, CA (US); Lochan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 16/868,979

(22) Filed: May 7, 2020

(65) Prior Publication Data

US 2020/0359259 A1 Nov. 12, 2020

Related U.S. Application Data

(60) Provisional application No. 62/985,162, filed on Mar. 4, 2020, provisional application No. 62/846,466, filed on May 10, 2019.

(51) Int. Cl.
*H04W 28/06* (2009.01)
*H04W 88/08* (2009.01)
(Continued)

(52) U.S. Cl.
CPC .......... *H04W 28/06* (2013.01); *H04L 1/1614* (2013.01); *H04L 47/34* (2013.01); *H04W 48/16* (2013.01); *H04W 84/12* (2013.01); *H04W 88/08* (2013.01)

(58) Field of Classification Search
CPC ..... H04W 28/06; H04W 48/16; H04W 84/12; H04W 88/08; H04L 1/1614; H04L 47/34
See application file for complete search history.

(56) References Cited

U.S. PATENT DOCUMENTS

| 2016/0044503 | A1* | 2/2016 | Djakovic | H04L 9/0869 713/168 |
| 2017/0332385 | A1* | 11/2017 | Shirali | H04W 28/0268 |

(Continued)

FOREIGN PATENT DOCUMENTS

WO WO-2021002617 A1 * 1/2021

OTHER PUBLICATIONS

David L.P., et al., "IEEE 802.11be Extremely High Throughput: The Next Generation of Wi-Fi Technology Beyond 802 .11ax", Feb. 12, 2019 (Feb. 12, 2019), XP055714804, 7 pages, Retrieved from the Internet: URL: https://arxiv.org/pdf/1902.04320v1.pdf. [retrieved on Feb. 12, 2019] the whole document.

(Continued)

*Primary Examiner* — Michael J Moore, Jr.
(74) *Attorney, Agent, or Firm* — Patterson + Sheridan, L.L.P.

(57) ABSTRACT

This disclosure provides systems, methods and apparatus, including computer programs encoded on computer storage media, for multi-link aggregation in wireless communications. In one aspect, an apparatus includes a multi-link operation device configured to generate and output for transmission a message indicating a mapping of each of a plurality of traffic identifiers (TIDs) to one or more parameters associated with each of a plurality of wireless links. In some aspects, another apparatus may obtain a message via at least one of a plurality of wireless links indicating a mapping of each of a plurality of TIDs to one or more parameters associated with each the plurality of wireless links, obtain a sequence of packets associated with at least (Continued)

one of the plurality of TIDs via one or more of the plurality of wireless links, and process the sequence of packets based on the mapping indicated via the message.

30 Claims, 16 Drawing Sheets

(51) Int. Cl.
<br>*H04L 47/34* (2022.01)
<br>*H04W 84/12* (2009.01)
<br>*H04L 1/16* (2006.01)
<br>*H04W 48/16* (2009.01)

(56) References Cited

U.S. PATENT DOCUMENTS

| | | | |
|---|---|---|---|
| 2018/0054847 A1* | 2/2018 | Cariou | H04W 28/08 |
| 2018/0205502 A1* | 7/2018 | Merlin | H04W 48/16 |
| 2018/0206284 A1* | 7/2018 | Zhou | H04W 76/15 |
| 2019/0335454 A1* | 10/2019 | Huang | H04L 41/0893 |
| 2019/0364555 A1* | 11/2019 | Huang | H04W 72/048 |
| 2020/0021400 A1* | 1/2020 | Cherian | H04L 5/0055 |
| 2020/0037288 A1* | 1/2020 | Huang | H04L 1/1614 |
| 2020/0137626 A1* | 4/2020 | Huang | H04W 28/0263 |
| 2020/0221545 A1* | 7/2020 | Stacey | H04W 48/16 |
| 2020/0267541 A1* | 8/2020 | Huang | H04W 12/041 |
| 2020/0314920 A1* | 10/2020 | Seok | H04W 74/0891 |
| 2020/0359259 A1* | 11/2020 | Patil | H04W 48/16 |
| 2020/0374907 A1* | 11/2020 | Viger | H04W 72/1284 |
| 2020/0396568 A1* | 12/2020 | Huang | H04W 4/06 |
| 2021/0037583 A1* | 2/2021 | Seok | H04W 76/15 |
| 2021/0195578 A1* | 6/2021 | Huang | H04W 72/048 |
| 2021/0337475 A1* | 10/2021 | Cariou | H04L 5/001 |

OTHER PUBLICATIONS

"IEEE Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications; IEEE Std 802.11-2016 (Revision of IEEE Std 802", IEEE Standard, IEEE, Piscataway, NJ, USA, Dec. 14, 2016 (Dec. 14, 2016), pp. 1-3534, XP068113034, [retrieved on Dec. 19, 2016], paragraph [10.3.2.4]; figures 10-5 paragraph [9.3.1.2]-paragraph [9.3.1.3].
<br>International Search Report and Written Opinion—PCT/US2020/032033—ISA/EPO—Mar. 2, 2021.
<br>Jauh A., (UNISOC): "Multi-Band Opinion", IEEE Draft, 11-19-0760-01-00BE-Multi-Band-Opinion, IEEE-SA Mentor, Piscataway, NJ, USA, vol. 802.11 EHT, 802.11be. No. 19 May 2019 (May 9, 2019), pp. 1-14. XP068151037. Retrieved from the Internet: URL: https://mentor.ieee.org/802.11/dcn/19/11-19-0760-01-00be-multi-band-opinion.pptx. [retrieved on May 9, 2019] p. 2-p. 10.
<br>Kaiying LV (ZTE Corp): "Discussion on Multiband for EHT", IEEE Draft, 11-19-0108-01-0EHT-Discussion-on-Multiband-for-EHT, IEEE-SA Mentor, Piscataway, NJ USA vol. 802.11 EHT, 802.11be. No. 1, Jan. 17, 2019 (Jan. 17, 2019), pp. 1-8. XP068159738, Retrieved from Nthe Internet: URL: https://mentor.ieee.org/802.11/dcn/19/11-19-0108-01-0eht-discussion-on-multiband -for-eht.pptx. [retrieved on Jan. 17, 2019] the whole document.
<br>Naribole S., (Samsung): "MAC Architectures for EHT Multi-band Operation", IEEE Draft, 11-19-0360-00-0EHT-MAC-Aechitectures-for-EHT-Multi-Band-Operation, IEEE-SA Mentor, Piscataway, NJ USA vol. 802.11 EHT, Mar. 13, 2019 (Mar. 13, 2019), pp. 1-8. XP068148224, Retrieved from the Internet: URL: https://mentor.ieee.org/802.11/dcn/19/11-19-0360-00-0eht-mac-architectures-for-eht-multi-band-operation.pptx. [retrieved on Mar. 13, 2019] the whole document.

\* cited by examiner

MULTI-LINK AGGREGATION LINK MANAGEMENT

CROSS-REFERENCE TO RELATED APPLICATIONS

This application claims benefit of U.S. Provisional Patent Application Ser. No. 62/846,466, filed May 10, 2019, and U.S. Provisional Patent Application Ser. No. 62/985,162, filed Mar. 4, 2020, which are expressly incorporated herein by reference in their entirety.

TECHNICAL FIELD

Aspects of the present disclosure generally relate to wireless communications and, more particularly, to multi-link aggregation.

BACKGROUND OF THE RELATED TECHNOLOGY

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (such as tens of meters to a few hundred meters).

SUMMARY

Certain aspects of the present disclosure generally relate to wireless communications and, more particularly, to techniques for link management for managing multi-link aggregation.

Certain aspects provide an apparatus for wireless communications. The apparatus generally includes a multi-link operation device configured to generate at least one message indicating a mapping of each of a plurality of traffic identifiers to one or more parameters associated with each of a plurality of wireless links, and at least one interface configured to output the at least one message for transmission via at least one of the plurality of wireless links.

Certain aspects provide an apparatus for wireless communications. The apparatus generally includes at least one interface configured to obtain, from a wireless node, at least one message via at least one of a plurality of wireless links indicating a mapping of each of a plurality of traffic identifiers to one or more parameters associated with each wireless link of the plurality of wireless links, and obtain, from the wireless node, a sequence of packets associated with at least one of the plurality of traffic identifiers via one or more of the plurality of wireless links, and a multi-link operation device configured to process the sequence of packets based on the mapping indicated via the at least on message.

Certain aspects provide an apparatus for wireless communications, including means for generating at least one message indicating a mapping of each of a plurality of traffic identifiers to one or more parameters associated with each of a plurality of wireless links, and means for outputting the at least one message for transmission via at least one of the plurality of wireless links.

Certain aspects provide an apparatus for wireless communications, including means for obtaining from a wireless node, at least one message via at least one of a plurality of wireless links indicating a mapping of each of a plurality of traffic identifiers to one or more parameters associated with each wireless link of the plurality of wireless links, and from the wireless node, a sequence of packets associated with at least one of the plurality of traffic identifiers via one or more of the plurality of wireless links, and means for processing the sequence of packets based on the mapping indicated via the at least one message.

Certain aspects provide a method for wireless communications, including generating, by an apparatus, at least one message indicating a mapping of each of a plurality of traffic identifiers to one or more parameters associated with each of a plurality of wireless links, and outputting, by the apparatus, the at least one message for transmission via at least one of the plurality of wireless links.

Certain aspects provide a method for wireless communications, including obtaining, by an apparatus, from a wireless node at least one message via at least one of a plurality of wireless links indicating a mapping of each of a plurality of traffic identifiers to one or more parameters associated with each wireless link of the plurality of wireless links, obtaining, by the apparatus, from the wireless node, a sequence of packets associated with at least one of the plurality of traffic identifiers via one or more of the plurality of wireless links, and processing, by the apparatus, the sequence of packets based on the mapping indicated via the at least one message.

Certain aspects provide a computer-readable medium including instructions for wireless communications, said instructions executable to generate at least one message indicating a mapping of each of a plurality of traffic identifiers to one or more parameters associated with each of a plurality of wireless links, and output the at least one message for transmission via at least one of the plurality of wireless links.

Certain aspects provide a computer-readable medium including instructions for wireless communications, said instructions executable to obtain, from a wireless node, at least one message via at least one of a plurality of wireless links indicating a mapping of each of a plurality of traffic identifiers to one or more parameters associated with each wireless link of the plurality of wireless links, obtain, from the wireless node, a sequence of packets associated with at least one of the plurality of traffic identifiers via one or more of the plurality of wireless links, and process the sequence of packets based on the mapping indicated via the at least one message.

Certain aspects provide a wireless node, including a multi-link operation device configured to generate at least one message indicating a mapping of each of a plurality of traffic identifiers to one or more parameters associated with each of a plurality of wireless links, at least one interface configured to output the at least one message, and at least one transmitter configured to transmit the at least one message via at least one of the plurality of wireless links.

Certain aspects provide a wireless node, including at least one receiver configured to obtain, from a wireless node, at least one message via at least one of a plurality of wireless links indicating a mapping of each of a plurality of traffic identifiers to one or more parameters associated with each wireless link of the plurality of wireless links, and obtain, from the wireless node, a sequence of packets associated with at least one of the plurality of traffic identifiers via one or more of the plurality of wireless links, and a multi-link operation device configured to process the sequence of packets based on the mapping indicated via the at least one message.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
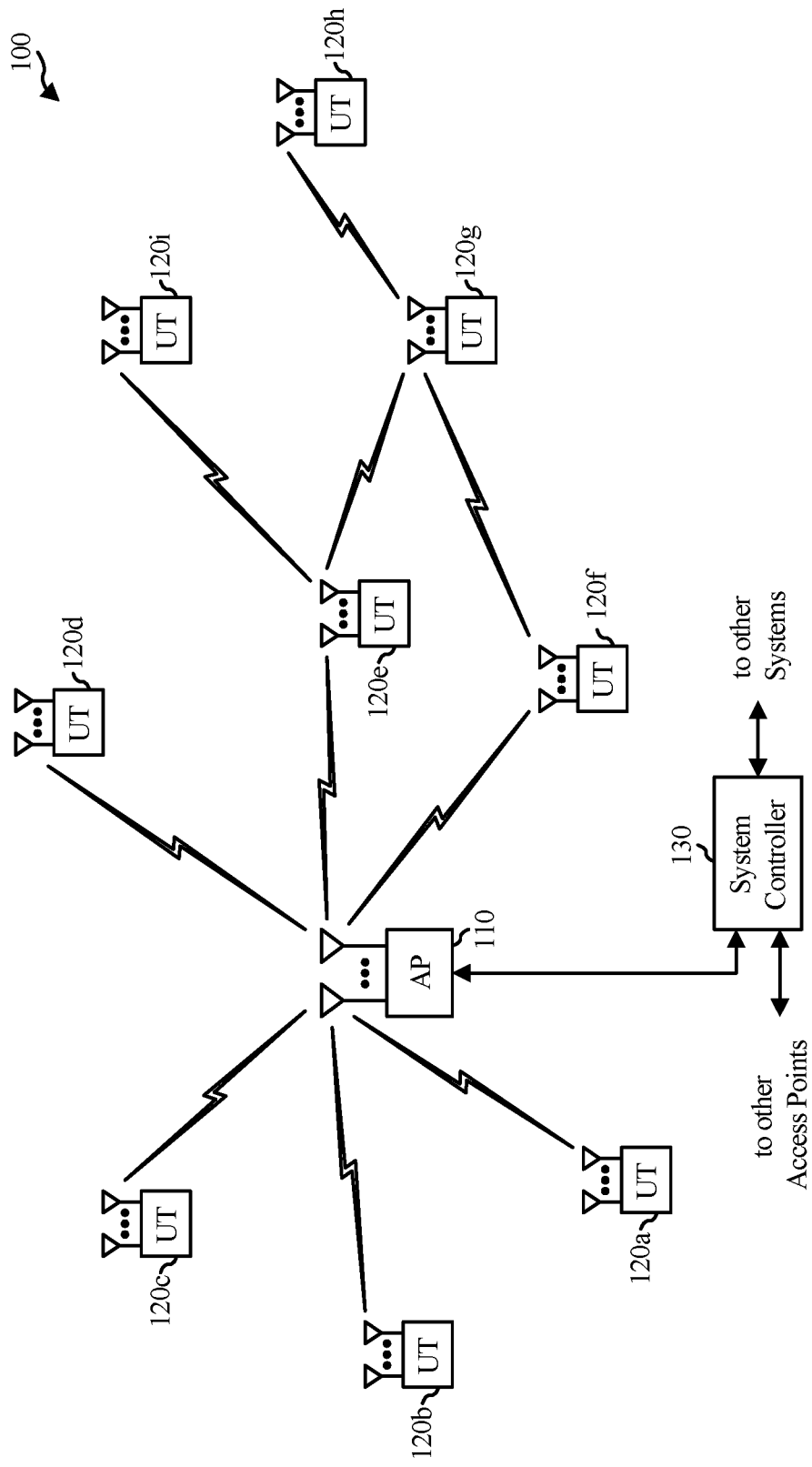
FIG. 1 is a diagram of an example wireless communications network, in accordance with certain aspects of the present disclosure.

Certain aspects of the present disclosure generally relate to wireless communications and, more particularly, to techniques for link management for managing multi-link aggregation. For example, certain aspects provide techniques for managing data flows for multi-link aggregation, mapping of data flows to wireless links, and mapping of link parameters to data traffic, as described in more detail herein.

Multiple bands may be implemented for wireless devices. For example, a wireless device may be able to support a 2.4 GHz band and a 5 GHz band. With multi-link aggregation, data flows may be transmitted across multiple wireless links which may be associated with different bands. That is, for packet level aggregation, packets of a data flow may be transmitted via different wireless links. Packet level aggregation serves to improve peak data throughput as compared to conventional implementations, and implements channel diversity. That is, packets belonging to the same traffic identifier (TID) may be sent over multiple wireless links to improve throughput. Moreover, with channel diversity, if one of wireless links becomes nonoperational, another one of the wireless links may still be available for communications. Moreover, spectral efficiency may be improved with multi-link aggregation by balancing the data traffic load of the wireless links.

In some cases, a wireless device may support transmission and reception on a single wireless link. Nevertheless, flow aggregation may be implemented for the wireless device by performing an association process for one link that applies to multiple links. Flow aggregation allows for a faster transition from one link to another if one link becomes nonoperational without having to perform association operations for the other link.

Certain aspects of the present disclosure implement logical entities to facilitate multi-link aggregation. For example, a multi-link (ML) operation (MLO) entity (also referred to herein as an MLO module, ML-service access point (ML-SAP entity, or ML device (MLD)) may be implemented. One or more MLO entities may be implemented in a processing system of an MLO device. An MLO entity generally refers to a logical entity that includes one or more stations (STAs) (such as virtual STAs) and has a single addressable MAC SAP endpoint (also referred to as an MLO endpoint). A STA may be an AP STA or a non-AP STA. An AP STA of an AP MLO entity may be a virtual AP (VAP) operating on that link. In other words, an AP of an AP MLO entity may be part of a multiple BSSID set or co-hosted set on a certain link. An MLO entity may be a controller that manages the wireless links, as described in more detail herein. A MAC SAP endpoint may be the interface between higher layers (such as TCP/IP layer) and the MAC layer of a client device. At an AP, the MAC SAP endpoint may be the interface for communications via a distribution system (DS).

As used herein, a STA generally refers to a logical entity that is a singly addressable instance of a medium access control (MAC) and physical layer (PHY) interface to the wireless medium (WM). A wireless link generally refers to a path consisting of a traversal of the WM that is usable to transfer MAC service data units (MSDUs) between two STAs. In some cases, the MLO entity and STAs may be part of an MLO device. An MLO device generally refers to a logical entity that is a collection of multiple MLO-entities.

Particular implementations of the subject matter described in this disclosure can be implemented to realize one or more of the following potential advantages. Various aspects described herein may facilitate communication of data packets across multiple links to improve channel diversity and throughput. For example, certain aspects provide techniques for efficiently indicating a mapping of traffic identifiers to parameters associated with the multiple links, allowing a wireless device to receive and decode data packets associated with the traffic identifiers. In certain aspects, multiple BSSIDs may be hosted on a wireless link in order for various networks to be configured for different purposes on a single link, such as a network for guests and another network for enterprise employees.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The acronyms listed below may be used herein, consistent with commonly recognized usages in the field of wireless communications. Other acronyms also may be used herein, and if not defined in the list below, are defined where first appearing herein.

ACK . . . Acknowledgement
A-MPDU . . . Aggregated Media Access Control Protocol Data Unit
AP . . . Access Point
BA . . . Block ACK
BAR . . . Block ACK Request
CRC . . . Cyclic Redundancy Check
DIFS . . . Distributed Interframe Space
EOF . . . End of Frame
EIFS . . . Extended Interframe Space
FCS . . . Frame Check Sequence
ID . . . Identifier
IEEE . . . Institute of Electrical and Electronic Engineers
LTF . . . Long Training Field
MAC . . . Media Access Control
MSB . . . Most Significant Bit
MIMO . . . Multiple Input Multiple Output
MPDU . . . MAC Protocol Data Unit
MU . . . Multi-User
MU-MIMO . . . Multi-User Multiple Input Multiple Output
NDP . . . Null Data Packet
OFDM . . . Orthogonal Frequency Division Multiplexing
OFDMA . . . Orthogonal Frequency Division Multiple Access
PHY . . . Physical Layer
PLCP . . . Physical Layer Convergence Protocol
PPDU . . . PLCP Protocol Data Unit
PSDU . . . PLCP Service Data Unit
QoS . . . Quality of Service
RDG . . . Reverse Direction Grant
S1G . . . Sub-1-GHz
SDMA . . . Spatial-Division Multiple Access
SIFS . . . Short Interframe Space
SIG . . . Signal
STA . . . Station
STBC . . . Space-Time Block Coding
STF . . . Short Training Field
SU . . . Single User
TCP . . . Transmission Control Protocol
VHT . . . Very High Throughput
WLAN . . . Wireless Local Area Network The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers also may be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may include an access point or an access terminal.

An access point ("AP") may include, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may include, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may include a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and also may be referred to as a base station or some other terminology. A user terminal may be fixed or mobile and also may be referred to as a mobile station, a wireless device, or some other terminology. Access point 110 may communicate with one or more user terminals 120 (i.e., UT 120) at any given moment on the downlink and uplink. The downlink (i.e., forward link) is the communications link from the access point to the user terminals, and the uplink (i.e., reverse link) is the communications link from the user terminals to the access point. A user terminal also may communicate peer-to-peer with another user terminal. A system controller 130 couples to and provides coordination and control for the access points.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions.

For a TDD system, the downlink and uplink share the same frequency band. For an FDD system, the downlink and uplink use different frequency bands. MIMO system 100 also may utilize a single carrier or multiple carriers for transmission. Each user terminal may be equipped with a single antenna (such as in order to keep costs down) or multiple antennas (such as where the additional cost can be supported).

Figure 2:
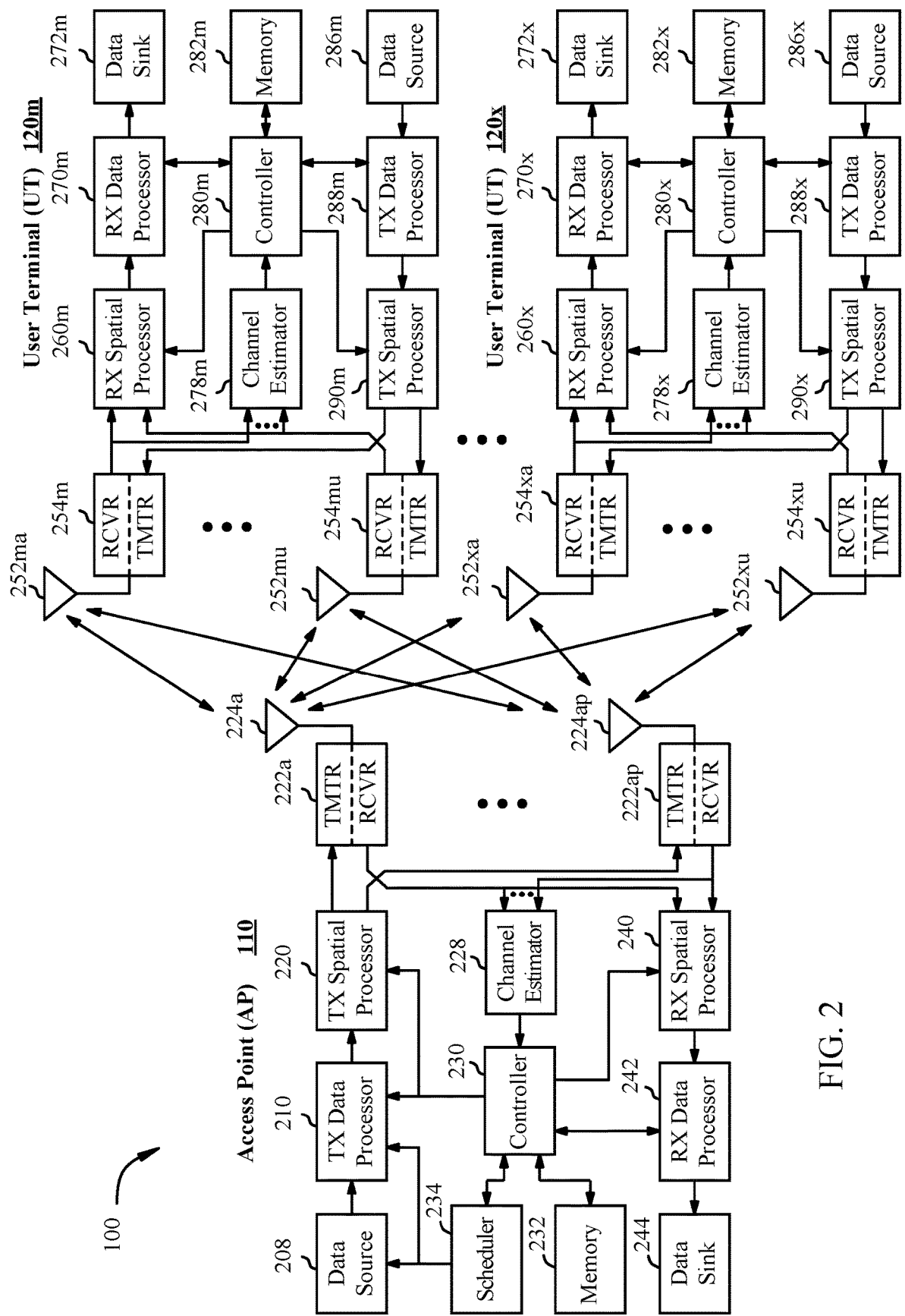
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 and user terminals 120m and 120x may be implemented for communication using OFDMA. OFDMA is a multi-user version of OFDM enabling concurrent AP communication (uplink & downlink) with multiple clients by assigning subsets of subcarriers, called Resource Units (RUs) to the individual clients. 802.11ax uses OFDMA technology for efficient access. OFDMA allows multiple users with varying bandwidth needs to be served simultaneously. OFDMA divides up the spectrum and allocates the spectrum to multiple different users if necessary.

Instead of conventional implementations where users compete with one another to send data in uplink, 802.11ax schedules them so that they don't clash with each other. This managed approach results in better resource utilization and an increase in efficiency. The main benefit of OFDMA is that it allows an AP to allocate the channel to a single user at a time or it may partition a channel to serve multiple users simultaneously. OFDMA is ideal for low bandwidth applications and results in better frequency reuse, reduced latency, and increased efficiency.

In certain aspects, the access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (such as encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (such as converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (such as demodulates, deinterleaves, and decodes) each recovered uplink data symbol stream in accordance with the rate used for that stream to obtain decoded data. The decoded data for each user terminal may be provided to a data sink 244 for storage or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (such as encodes, interleaves, and modulates) the traffic data for each user terminal based on the rate selected for that user terminal. TX data processor 210 provides NA downlink data symbol streams for the NA user terminals. A TX spatial processor 220 performs spatial processing (such as a precoding or beamforming, as described in the present disclosure) on the Nan downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (such as demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. The channel estimation may facilitate communication using multi-link aggregation, as described in more detail herein.

Figure 3:
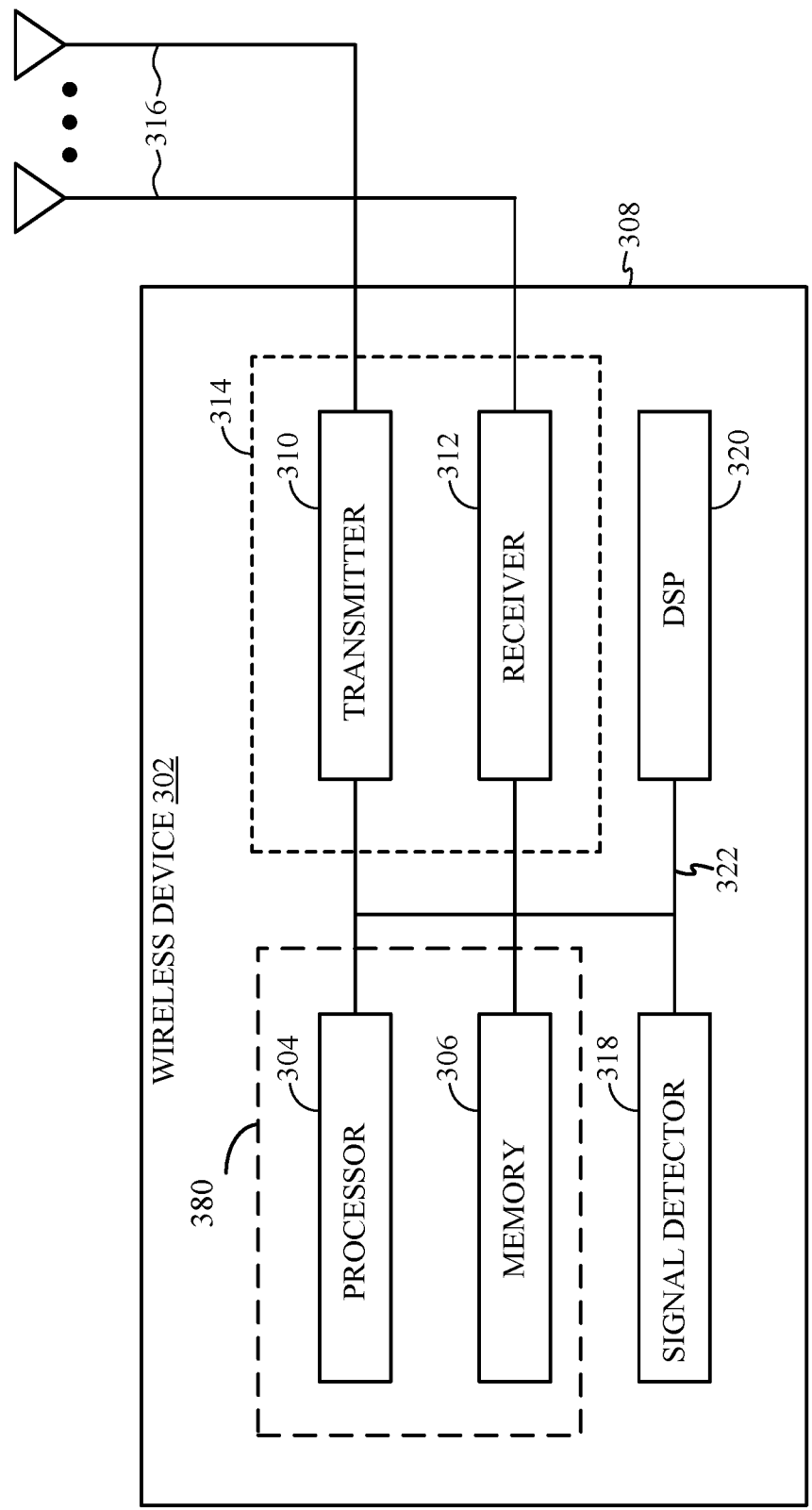
FIG. 3 is a diagram illustrating signal propagation in an implementation of phased-array antennas, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 also may be referred to as a central processing unit (CPU). In certain aspects, the processor 304 may be implemented as a multi-link operation (MLO) device for performing the operations described herein for multi-link data communication. In certain implementations, memory 306, which may include one or both of read-only memory (ROM) and random access memory (RAM), provides instructions and data to the processor 304. A portion of the memory 306 also may include non-volatile random access memory (NVRAM). The processor 304 performs logical and arithmetic operations based on program instructions stored within the memory 306. The instructions in the memory 306 may be executable to implement the methods described herein. For example, in some aspects, the processor 304 and memory 306 may form a processing system and may be part of an MLO device 380 for managing multi-link data communication, as described in more detail herein.

The wireless device 302 also may include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 also may include (not shown) multiple transmitters, multiple receivers, and multiple transceivers.

The wireless device 302 also may include a signal detector 318 that may be used in an effort to detect and quantify the level of signals received by the transceiver 314. The signal detector 318 may detect such signals as total energy, energy per subcarrier per symbol, power spectral density and other signals. The wireless device 302 also may include a digital signal processor (DSP) 320 for use in processing signals.

The various components of the wireless device 302 may be coupled together by a bus system 322, which may include a power bus, a control signal bus, and a status signal bus in addition to a data bus.

Figure 4A:
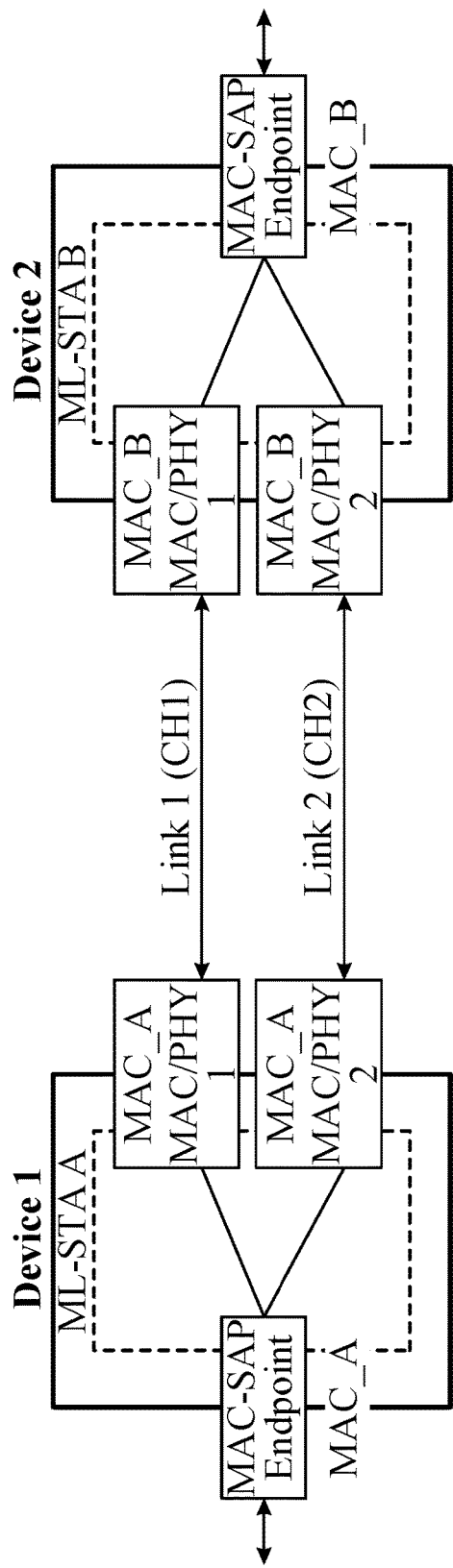
FIGS. 4A, 4B, 4C, 4D illustrate example wireless communications systems for multi-link aggregation, in accordance with certain aspects of the present disclosure.

FIGS. 4A, 4B, 4C and 4D illustrate example wireless communications systems for multi-link aggregation, in accordance with certain aspects of the present disclosure. For example, as illustrated in FIG. 4A, packet aggregation may be implemented via MAC SAP endpoints of devices 1 and 2. Each of the MAC SAP endpoints are associated with (such as coupled to) multiple STAs (such as MAC/PHY interfaces) to wireless links 1 and 2. Packets of a data flow may be transferred between the devices across either of the wireless links 1 and 2 to implement packet aggregation, as described herein.

Figure 4B:
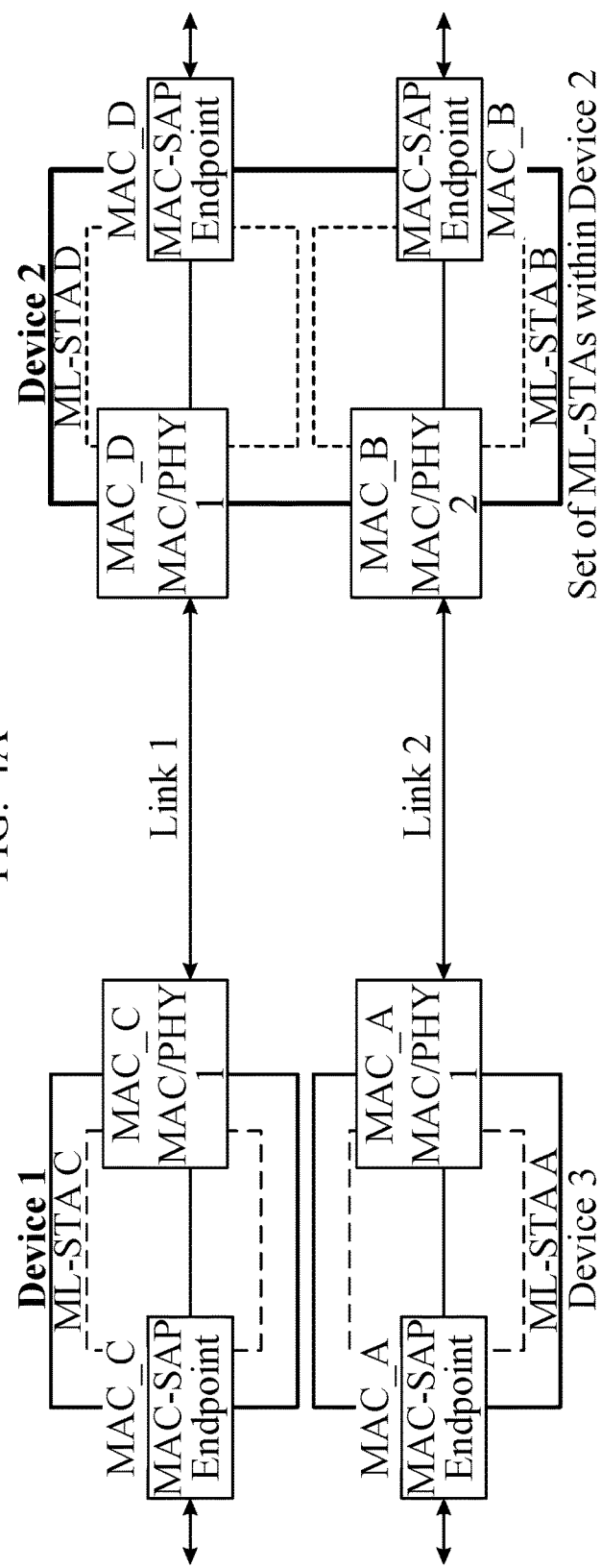
Figure 4C:
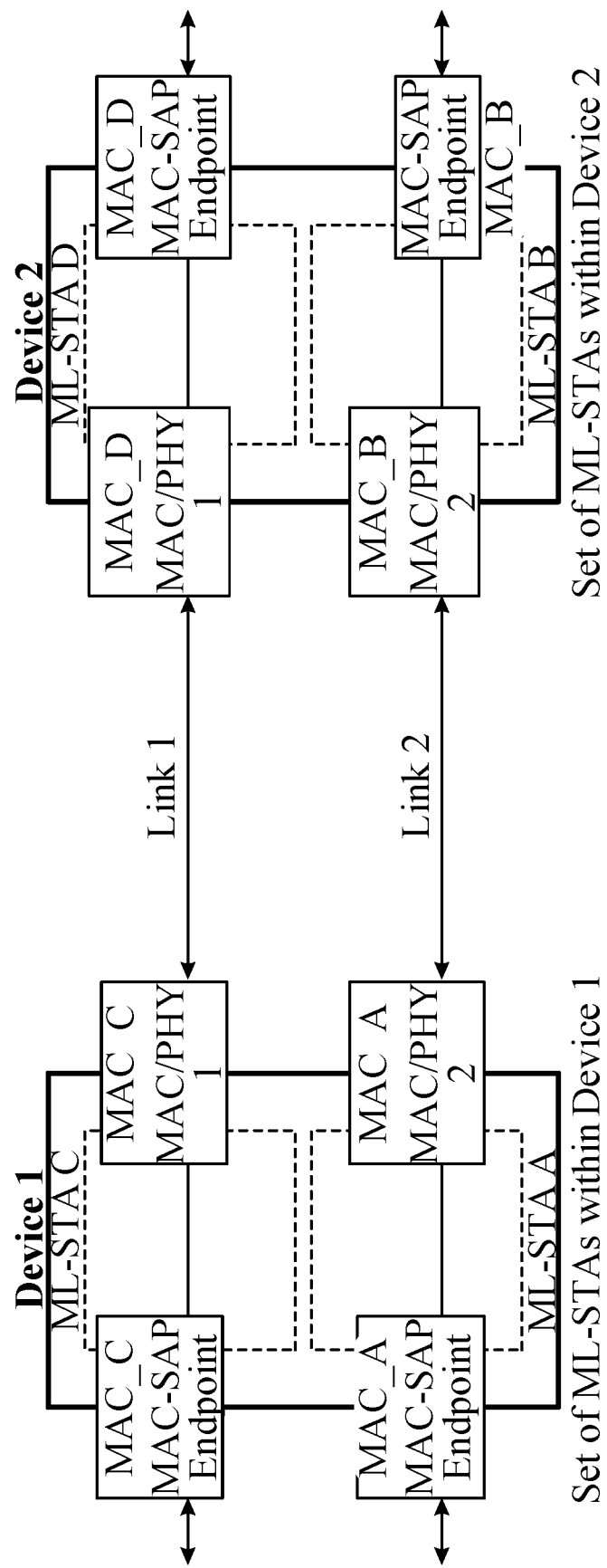

For flow aggregation, as illustrated in FIG. 4C, separate MAC SAP endpoints may be associated with each of the STAs of the MLO devices 1 and 2. Therefore, a data flow of packets may be communicated over one of the wireless links 1 and 2, yet a transition from one link to another is possible with flow-level aggregation without an association process, as described herein.

Figure 4D:
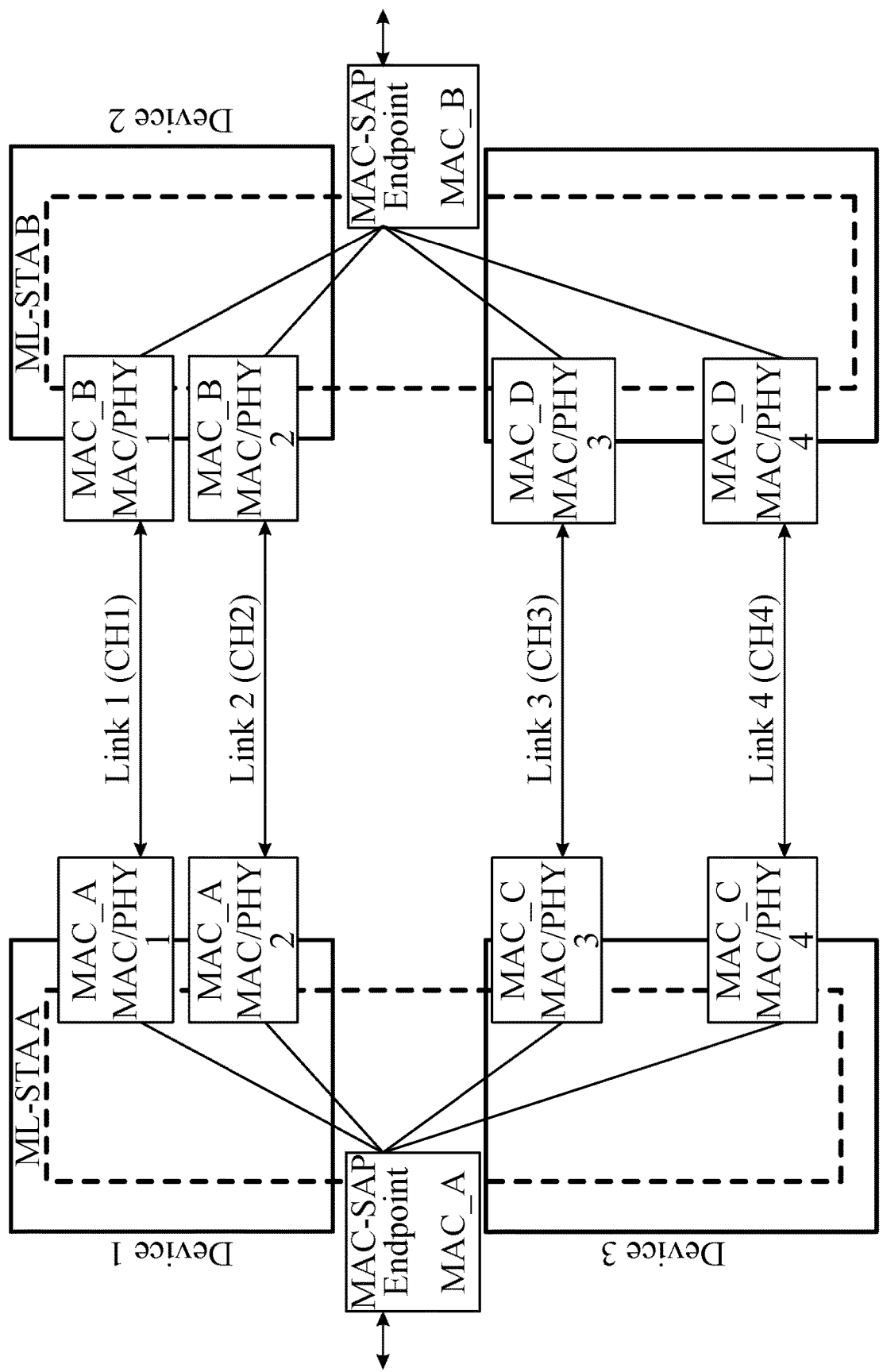

While FIGS. 4A and 4C illustrate collocated wireless communications systems, FIG. 4B and FIG. 4D illustrate non-collocated implementations for flow aggregation and packet aggregation. For example, as illustrated in FIG. 4B, each of the MAC SAP endpoints associated with an AP may be implemented in separate MLO devices 1 and 3. Similarly for packet aggregation, as illustrated in FIG. 4D, a MAC SAP endpoint may be associated with STAs (such as MAC/PHY interfaces) across multiple devices 1 and 3.

Figure 5:
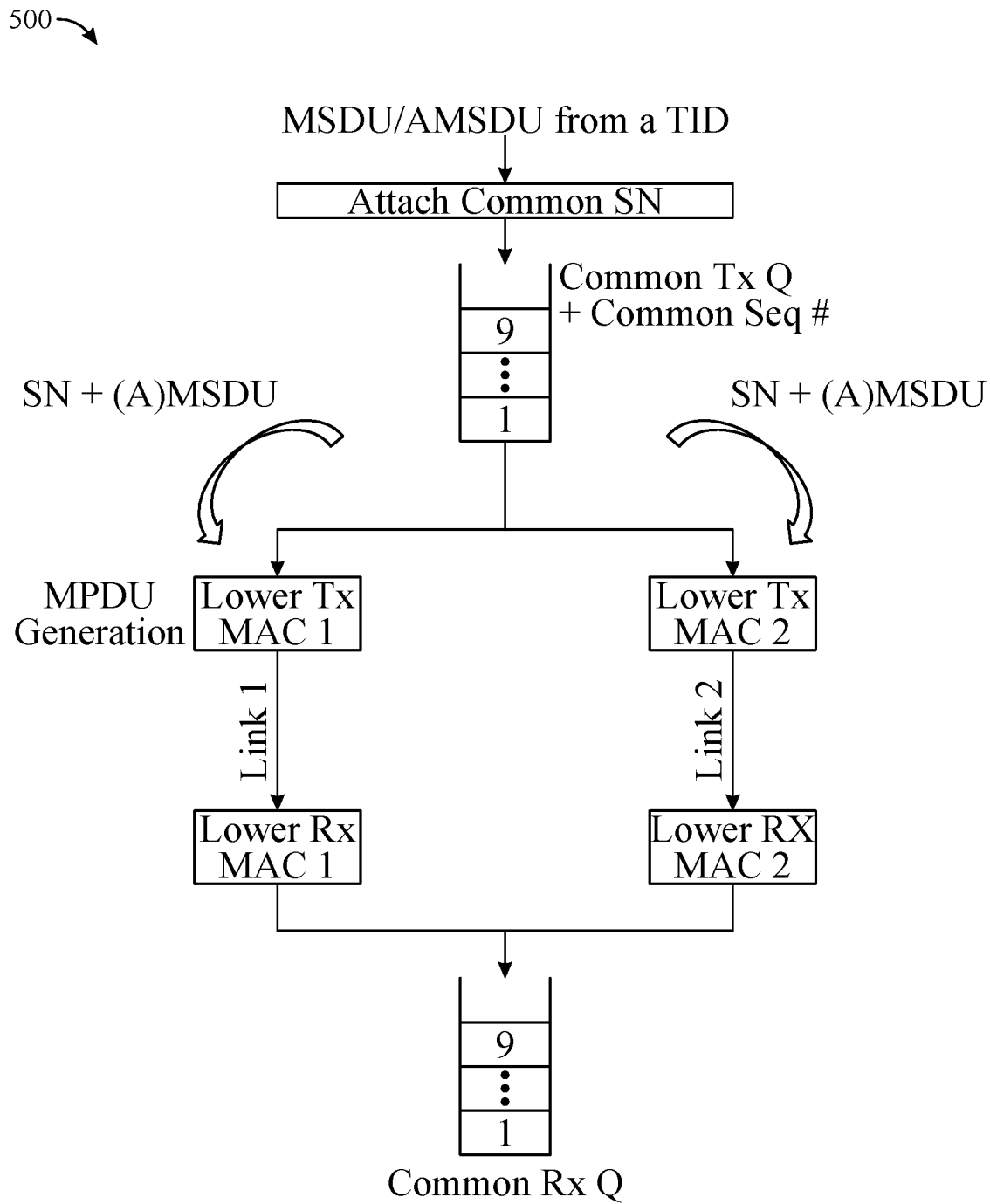
FIG. 5 illustrates a wireless communications system, in accordance with certain aspects of the present disclosure.

FIG. 5 illustrates a wireless communications system 500, in accordance with certain aspects of the present disclosure.

As illustrated, an MAC service data unit (MSDU) or aggregated MSDU (AMSDU) may be received by an MLO entity, which may attach a common sequence number (SN) to the packets of the MSDUs or AMSDUs. The packets may be stored in a common queue (such as buffer) (such as common across multiple wireless links). An MPDU including the packets may be generated at the MAC layer and transmitted via different wireless links for packet aggregation, as illustrated. The lower MAC/PHY layers of the receiver may provide the packets to a common queue of another MLO device at the receiver, as illustrated.

The wireless communications system 500 implements a single-link interface to higher layers, and may provide a shared SN space and block acknowledgement (BA) scoreboard across the wireless links. That is, different packets belonging to the same SN may be transmitted across different wireless links, and acknowledgements of packets may be received on a different link than the link used to transmit one or more of the packets in the sequence. A single block acknowledgment request (BAR) may elicit BA for MPDUs sent on any or all links. ACKs may be aggregated with MPDUs on a reverse link. Moreover, retransmissions of data may not be on the same wireless link as the original transmission.

Figure 6:
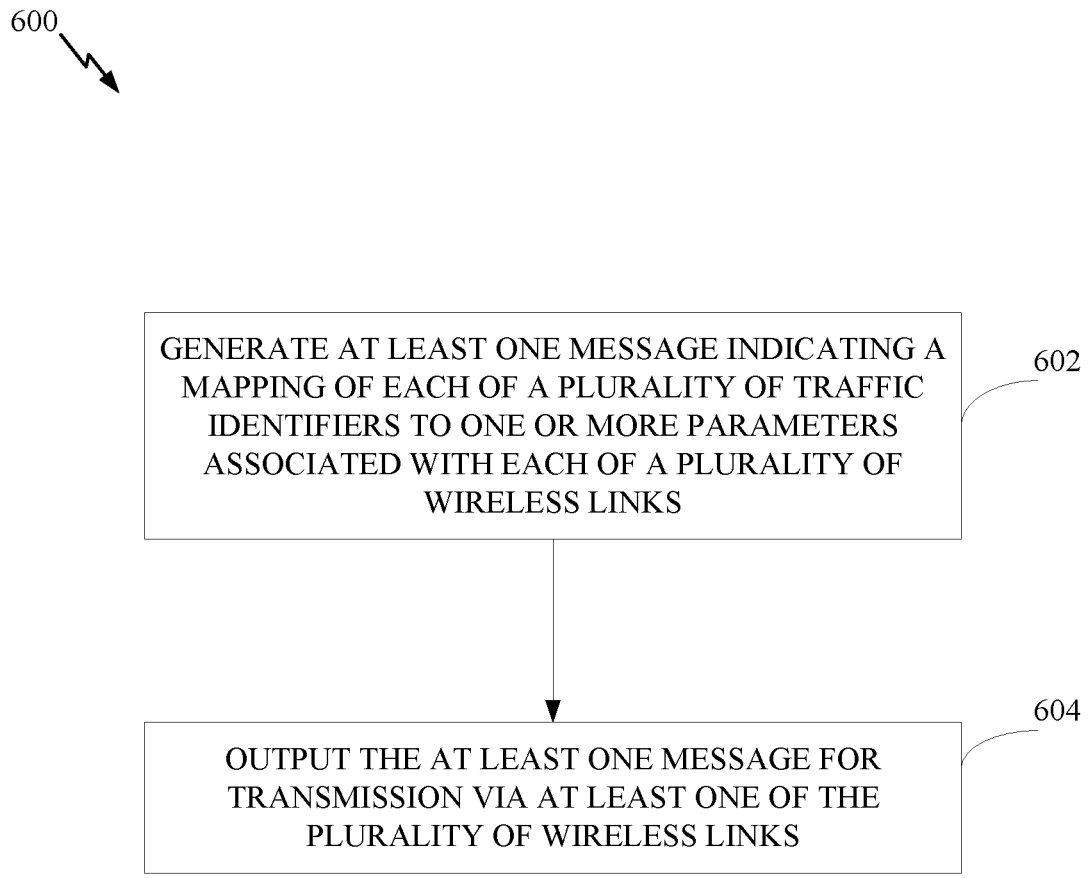
FIG. 6 is a flow diagram illustrating example operations for wireless communications, in accordance with certain aspects of the present disclosure.

FIG. 6 is a flow diagram illustrating example operations 600 for wireless communications, in accordance with certain aspects of the present disclosure. The operations 600 may be performed, for example, by a transmitter device, such as a user terminal (such as a UT 120 in the wireless communications network 100) or an access point (such as an AP 110 in the wireless communications network 100).

At block 602, by the transmitter device generating (such as via an MLO device) at least one message indicating a mapping of each of a plurality of traffic identifiers to one or more parameters associated with each of a plurality of wireless links. The MLO entity may be incorporated in a processing system, in some aspects.

The one or more parameters may include at least one of an address associated with the multi-link operation device, a channel number associated with the wireless link or an operating class associated with the wireless link, as described in more detail herein. In some cases, the at least one message may include a first message indicating a link identifier associated with each of the plurality of wireless links, the link identifier indicating the one or more parameters, and a second message indicating the mapping of each of the plurality of traffic identifiers to at least one of the link identifiers, as described in more detail herein.

At block 604, the transmitter device outputs (such as via at least one interface) the at least one message for transmission via at least one of the plurality of wireless links. The at least one interface may be a bus interface of the processing system, or a MAC/PHY interface (also referred to herein as a STA), as described in more detail herein.

In some cases, the transmitter device also may generate a sequence of packets. In this case, the at least one interface may be configured to output the sequence of packets for transmission via at least one of the plurality of wireless links. For example, the at least one interface may include a first interface (such as MAC/PHY interface, also referred to as STA herein) associated with a first wireless link of the plurality of wireless links, and a second interface (such as MAC/PHY interface) associated with a second wireless link of the plurality of wireless links. For instance, some of the packets of the sequence may be transmitted via one of the plurality of wireless links, and other packets of the sequence may be transmitted via another one of the plurality of wireless links for packet aggregation, as described in more detail herein.

Figure 7:
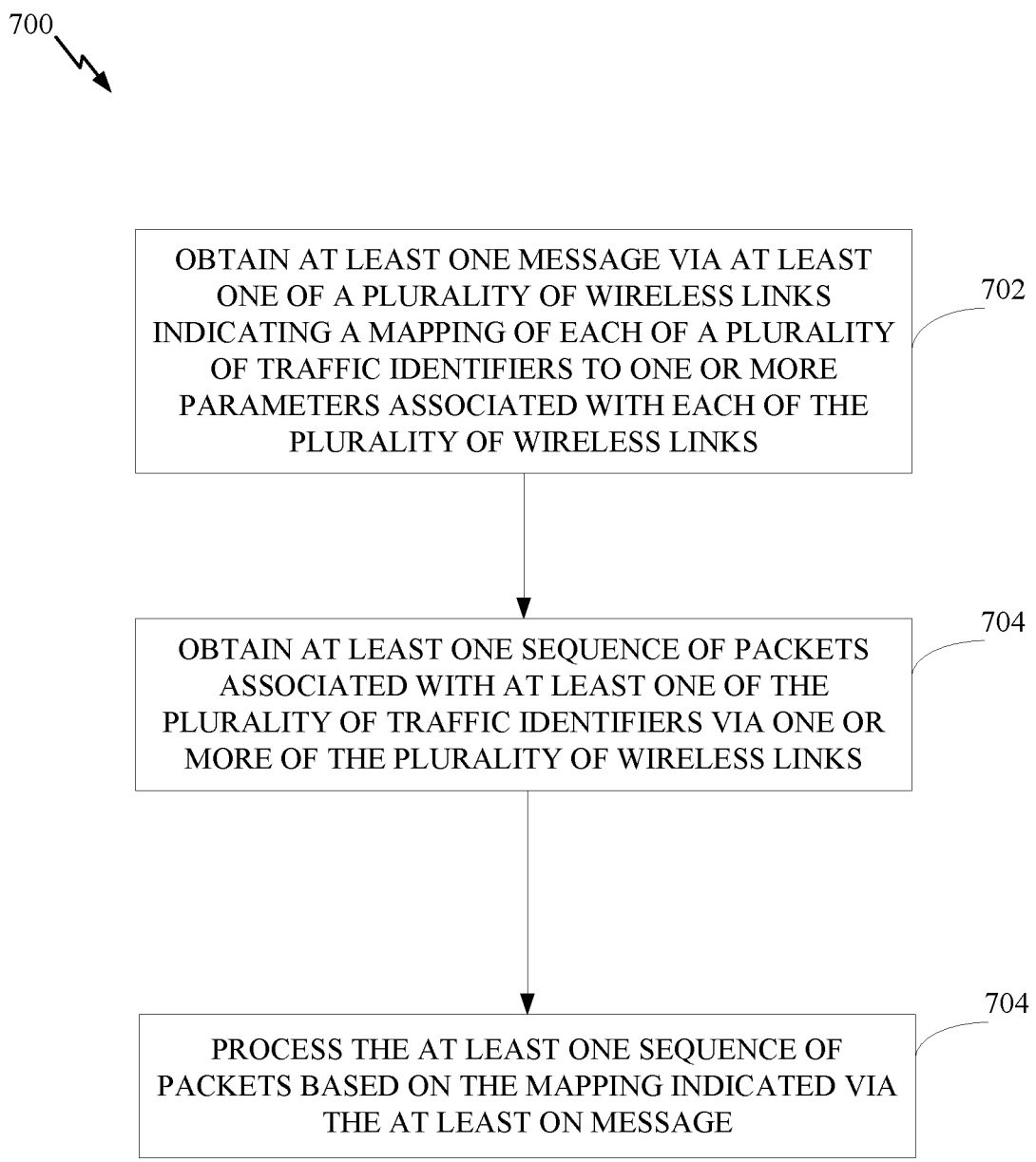
FIG. 7 is a flow diagram illustrating example operations for wireless communications, in accordance with certain aspects of the present disclosure.

FIG. 7 is a flow diagram illustrating example operations 700 for wireless communications, in accordance with certain aspects of the present disclosure. The operations 700 may be performed, for example, by a receiver device, such as a user terminal (such as a UT 120 in the wireless communications network 100) or an access point (such as an AP 110 in the wireless communications network 100). The operations 700 may be complimentary operations by the receiver device to the operations 600 performed by the transmitter device.

At block 702, by the receiver device obtaining at least one message via at least one of a plurality of wireless links indicating a mapping of each of a plurality of traffic identifiers to one or more parameters associated with each of the plurality of wireless links. At block 704, the receiver device obtains a sequence of packets associated with at least one of the plurality of traffic identifiers via one or more of the plurality of wireless links, and at block 706, processes the sequence of packets based on the mapping indicated via the at least on message.

Figure 8A:
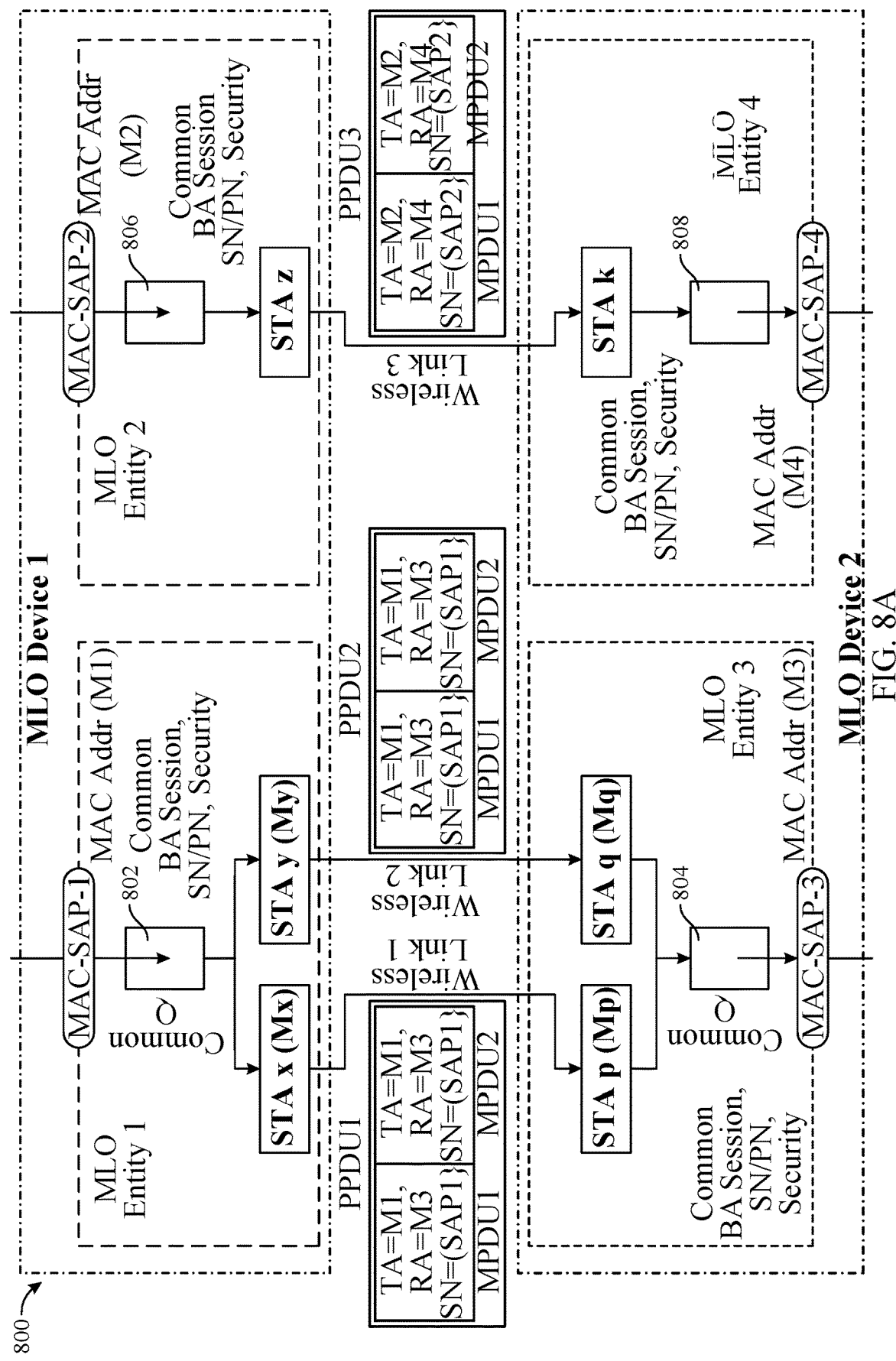
FIG. 8A illustrates an example wireless communications system, in accordance with certain aspects of the present disclosure.

FIG. 8A illustrates an example wireless communications system 800, in accordance with certain aspects of the present disclosure. As illustrated, an MLO device (such as MLO device 1) may include multiple MLO entities (such as MLO entities 1 and 2), also referred to as ML devices. The MLO entity 1 manages STA x and STA y, while MLO entity 2 manages STA z. STA x may be associated with wireless link 1 to STA p, STA y may be associated with wireless 2 to STA q, and STA z may be associated with wireless link 3 to STA k, as illustrated. Each of the MAC SAP interfaces (MAC-SAP-1, MAC-SAP-2, MAC-SAP-3, MAC-SAP4 may be associated with multiple STAs or a single STA, as illustrated. As described herein, an STA may be an AP STA or a non-AP STA. For instance, STA x, STA y, and STA z may be virtual AP STAs hosted by a physical AP, and STA p, STA q, and STA k may be non-AP STAs hosted by a physical non-AP STA device. Each of STA x and STA y may implement a virtual AP (VAP) that hosts a basic service set (BSS) associated with a BSSID. In other words, a multiple BSS identifier (BSSID) set feature may be implemented by enabling multiple BSSIDs, each associated with a VAP (such as STA x and STA y), which may be hosted on the same MLO entity.

An MLO entity may be implemented with a common block ACK session, SN, PN, and security for the multiple wireless links. For instance, VAPs of an MLO entity may share common parameters such as common security, BA session, and possible service set identifier (SSID). As an example use case, an enterprise network may use multiple links of an MLO entity having the same SSID, common security and BA session. However, a guest network may be implemented that uses a subset of the wireless links that share security and BA session. Within MLO entity 1, all wireless links may have the same BA scoreboard. Thus, if a transmission of packets is on wireless link 1, an acknowledgement may be solicited on wireless link 2, as described with respect to FIG. 5 since both wireless links 1 and 2 are serving a common queue (buffer) (such as common queue 802 and 804). A common queue allows buffered packets to be transmitted in either the available wireless links. In some cases, downlink signaling may be on one wireless link, and uplink signaling may be implemented on another. MLO entities 2 and 4 also include respective queues 806, 808 for wireless link 3, as illustrated. The SN facilitates the acknowledgement procedure described herein. The SN corresponding to a sequence of packets may be shared across all the wireless links that are managed by an MLO entity. Thus, a single BA request (BAR) frame may be sent on one link, soliciting acknowledgement to be transmitted for a sequence of packets identified by the SN. The ACK may be sent on the same link as the BAR or on another link, as described herein.

In some cases, multiple VAPs may be implemented on the same wireless link. However, since each VAP on a wireless link may have a different set of attributes, the VAPs using the same wireless link may be part of different ML entities. For example, STA x and STA z may be VAPs using the same wireless link and implemented on different MLO entities 1 and 2. Thus, different MLO entities may operate on the same set of links, each MLO entity having its own set of common attributes. On the other hand, a set of VAPs using different wireless links may be implemented on the same MLO entity.

Certain aspects of the present disclosure are directed to techniques for common management signaling across MLO entities. For example, an MLO device may manage multiple MLO entities (such as MLO entity 1 and 2). Therefore, a message may be transmitted via MLO entity 1 (such as via either one of the wireless links 1 or 2) to request one or more actions to be performed for MLO entity 2. For example, the one or more actions may include waking up MLO entity 2 which may be in a sleep mode of operation. For instance, the message may be sent on a 5 GHz wireless link to wake up the radio on the 2.4 GHz link since an active transmission is expected on the 2.4 GHz link.

A radio interface (such as a link) may be mapped to a single MAC-SAP interface having a MAC address. Each STA may be bound to a single MLO entity. For example, MAC address M1 may be associated with MAC SAP 1, and MAC address M3 may associated with MAC-SAP-3. Thus, PPDUs transmitted from the MLO entity 1 to MLO entity 3 may have a transmitter address (TA) of M1 and receiver address (RA) of M3 regardless of the link on which the PPDU is sent.

A MSDU belonging to a flow may be transmitted on one or more links that are associated with a specific MAC-SAP entry-point. In other words, a flow entering via another MAC-SAP (such as MAC-SAP-2) may not traverse through a STA belonging to another MAC-SAP (such as MAC-SAP-1). Moreover, all MPDUs transmitted on any wireless link belonging to a particular MAC-SAP have the TA set to the address of the MAC-SAP to which the wireless link belongs.

In certain aspects, packets associated with one or more TIDs within an ML-SAP may be transmitted on the same link or different links as described herein. For example, packets of each of multiple TIDs may be transmitted over different links for packet level aggregation. Flow-level aggregation may be supported by restricting a TID to a single link. That is, an association may be performed for one of the wireless links and the association parameters (such as the association ID) may be common and shared across all links. Therefore, transitioning from one link to another may not require another association procedure for the other link, as described herein.

In certain aspects, association identifier (AID) space may be common across the MLO entities of an MLO device. In other words, the AID of each of the MLO entities may be unique. The unique AID of each of the MLO entities allows one MLO entity to refer to another MLO entity. For example, one MLO entity (such as MLO entity 1) of an MLO device may send an indication to an AP (such as to MLO entity 3) requesting an action to be performed for another MLO entity (such as MLO entity 2) of the MLO device by indicating the AID associated with the other MLO entity. In other words, a unique AID may be used to enable the common management signaling across MLO entities (such as for power saving) as described herein.

Since packet aggregation increases data throughput, the common queue of the MLO entity may be drained faster as compared to conventional implementations. Thus, in certain aspects, the SN space may be increased (such as beyond 256 to 1024) to facilitate the increased throughput.

Moreover, a common packet number (PN) space allows for avoidance of a replay attack. For example, if a duplicate of a packet is sent, the receiver may discard the duplicate packet having the same PN as a previous packet received. Therefore, having a common space PN prevents (or at least reduces the likelihood) a successful replay attack. Moreover, security may be common among the wireless links of an MLO entity. For example, all the packets of a sequence may have the same encryption key.

Certain aspects allow for dynamic expansion of links. As described herein, association of one link may be applicable to all links of the MLO entity. A receiver may be monitoring only one link (such as for power saving) until the receiver receives an indication (such as a beacon) indicating that transmissions via multiple links are to begin. Based on the indication, the receiver may begin monitoring both links for a specific TID.

Figure 8B:
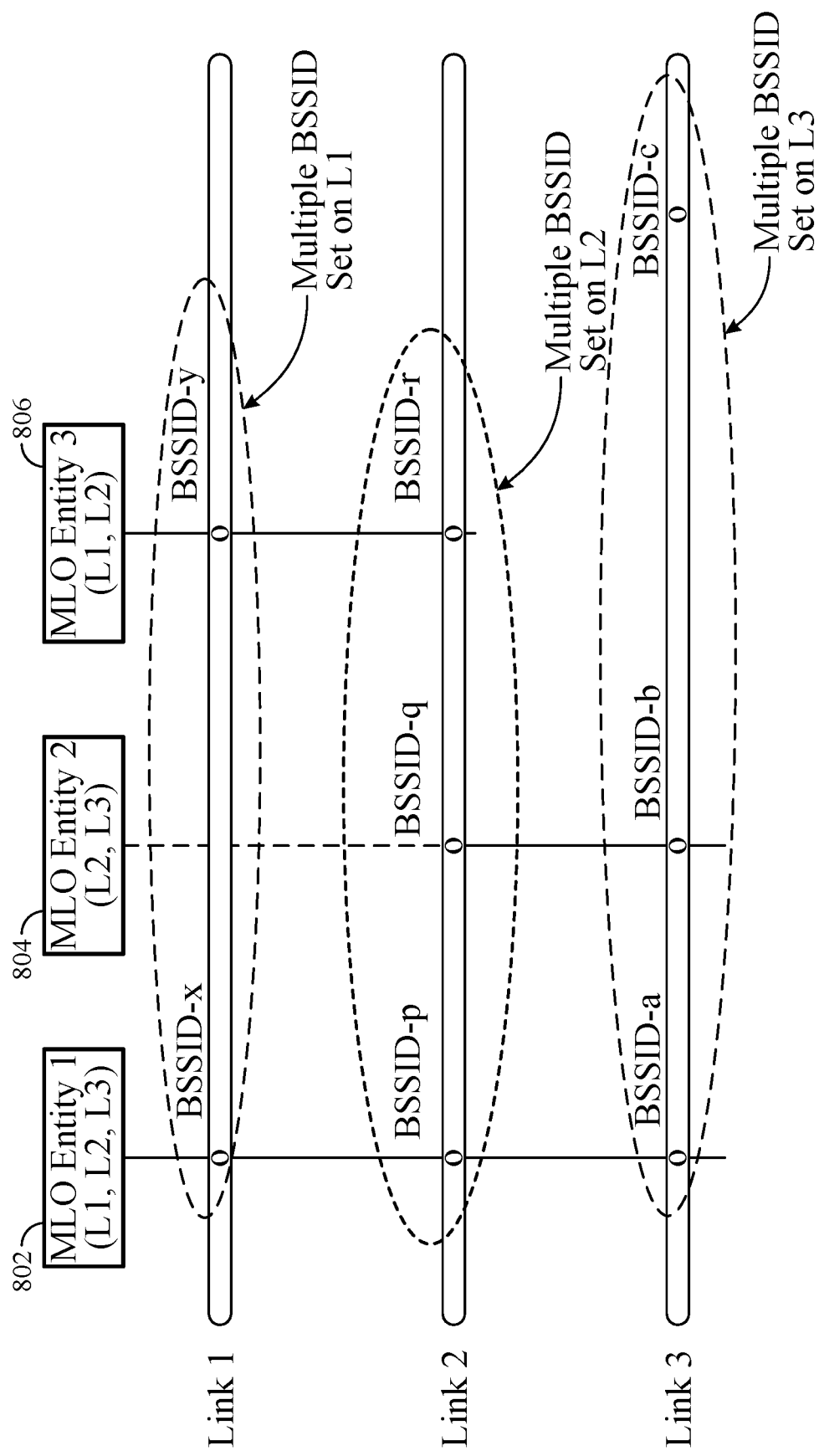
FIG. 8B illustrates multiple entities, each managing a different wireless link, in accordance with certain aspects of the present disclosure.

FIG. 8B illustrates multiple MLO entities 802, 804, 806, each managing one or more of wireless links 1, 2, and 3, in accordance with certain aspects of the present disclosure. As illustrated, MLO entity 1 may host different BSSIDs (such as BSSID-x, BSSID-p, BSSID-a) on links 1, 2, and 3, MLO entity 2 may host different BSSIDs (such as BSSID-q, BSSID-b) on links 2 and 3, and the MLO entity 3 may host different BSSIDs (such as BSSID-y, BSSID-r) on links 1 and 2. Thus, on each of the links 1, 2, and 3, multiple BSSID set may be hosted, as illustrated. Each of the MLO entities may have VAPs hosting each of the BSSIDs of the associated links. As an example, an enterprise network may be implemented with various VAPs, each VAP being for a different purpose (such as for guests and for enterprise employees) and providing access to different links. The VAPs may be implemented on the same physical device (such as AP).

In some aspects, a beacon transmitted via one VAP may carry a multi-link attribute element which provides information of the advertising BSSID's MLO entity information and other links that are part of that MLO entity. In some cases, information of other wireless links may be advertised as partial profile to prevent beacon bloating. In some cases, a beacon for a VAP (such as STA x of MLO entity 1) operating on a wireless link may indicate a multiple BSSID (MBSSID) information element (IE) which provides information of all the VAPs (such as a VAP of MLO entity 2) operating on the wireless link. In other words, a beacon transmitted via a VAP on link 2 may advertise other BSSIDs available on link 2 that are hosted by the same physical device (MLO device). The beacon also carries a multi-link attribute element which provides information of the advertising BS SID's MLO entity information and other links that are part of that AP MLO entity. For a co-hosted BSSID set, each VAP in a co-hosted BSSID set may transmit its own beacon for each link and probe response frames.

Figure 9:
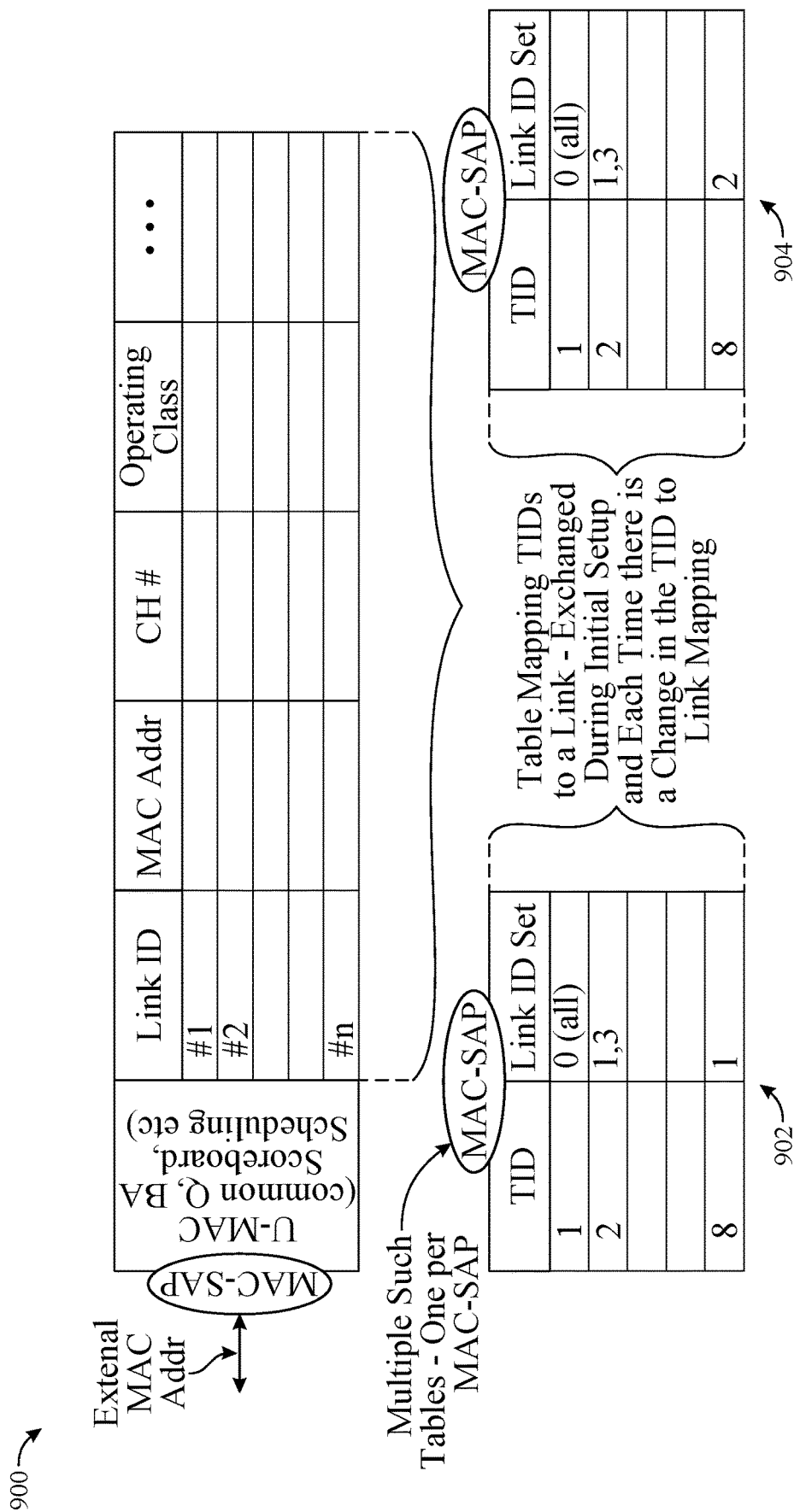
FIG. 9 illustrates tables for mapping of link identifiers to one or more parameters and mapping of traffic identifiers (TIDs) to link identifiers, in accordance with certain aspects of the present disclosure.

FIG. 9 illustrates tables 900, 902 and 904 for mapping of link identifiers to one or more parameters and mapping of TIDs to link identifiers (IDs), in accordance with certain aspects of the present disclosure. For example, an MLO device that manages multiple MAC SAPs also may manage the mapping of links to parameters (such as represented by tables 900, 902 and 904) for each of the MAC SAPs. The link IDs may be unique within a MAC-SAP interface. The table 900 illustrates the mapping of link IDs to a tuple of parameters associated with the link ID that uniquely identifies a corresponding link. That is, addresses may be different for links for flow-level aggregation implementations or non-collocated implementations. Therefore, to identify a specific link, a MAC address may be indicated together with other parameters such as the channel number and operating class. For co-located packet level aggregation, the MAC addresses may be the same as the address of the MAC-SAP endpoint.

In certain aspects, the link ID may be an index that represents the MAC address, channel number, and operating class. In other words, a transmitter device may only communicate the link ID to the receiver device, and based on the link ID, the receiver device may determine the corresponding parameters associated with the link ID. In certain aspects, the link IDs may be common across multiple MLO entities. Thus, indicating a set of parameters may involve indicating the link ID together with the address of the associated MLO entity.

Table 902 illustrates the mapping of TIDs to link IDs. As illustrated, one TID may be mapped to multiple links (such as links 1 and 3) (such as for packet aggregation). In certain aspects, a specific link ID (such as link ID=0) may be used to indicate the corresponding TID maps to all links. Thus, the mapping represented by table 900 may be exchanged during an initial setup process of links. The mapping of TIDs to link IDs, represented by table 902, may be exchanged during initial setup, as well as whenever a change to the mapping of TIDs to link IDs occurs. For example, as illustrated in table 904, the mapping of TID 8 may be changed from link ID 1 to link ID 2. After this change occurring, the table 904 may be exchanged to communicate this change.

In certain aspects, link specific constraints also may be indicated as part of the mapping of link IDs to the parameters represented by table 900. For example, coordination of transmissions on two different links may be necessary if simultaneous reception of signals via the two links is not possible. This constraint may be part of table 900, in certain aspects.

Figure 10:
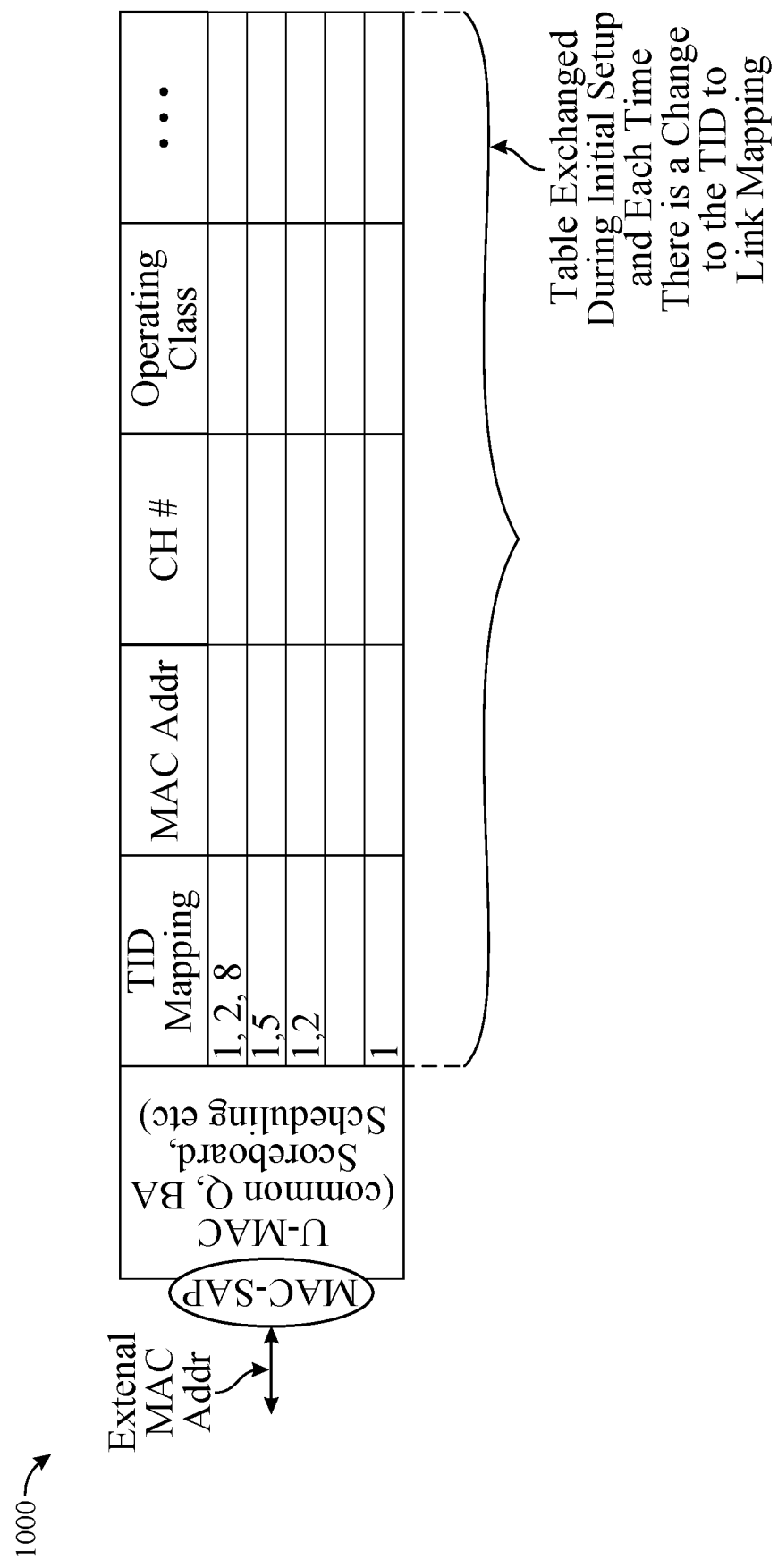
FIG. 10 illustrates table for mapping TIDs to parameters associated with a corresponding link, in accordance with certain aspects of the present disclosure.

FIG. 10 illustrates table 1000 for mapping TIDs to parameters associated with a corresponding link, in accordance with certain aspects of the present disclosure. In this case, TIDs are mapped to parameters associated with respective links. For example, the table 1000 maps TIDs 1, 2 and 8 to a specific MAC address, channel number, and operating class that represent a specific link. Thus, instead of explicit link ID as described with respect to FIG. 9, one or more TIDs are indicated as being supported by a specific link. However, having defined link IDs as described with respect to FIG. 9 allows for links to be referenced when exchanging information between the receiver device and a transmitter device.

In some cases, an AID may be mapped to each of the wireless links. In other words, each link may have a separate AID. For example, the exchange of the mapping for a specific link may be indicated using AIDs. For instance, a beacon may indicate that a TID is supported by one or more AIDs that correspond to respective wireless links. In some cases, a STA may indicate upcoming traffic on a particular link by setting a bit position matching the AID value for that link to 1.

Figure 11:
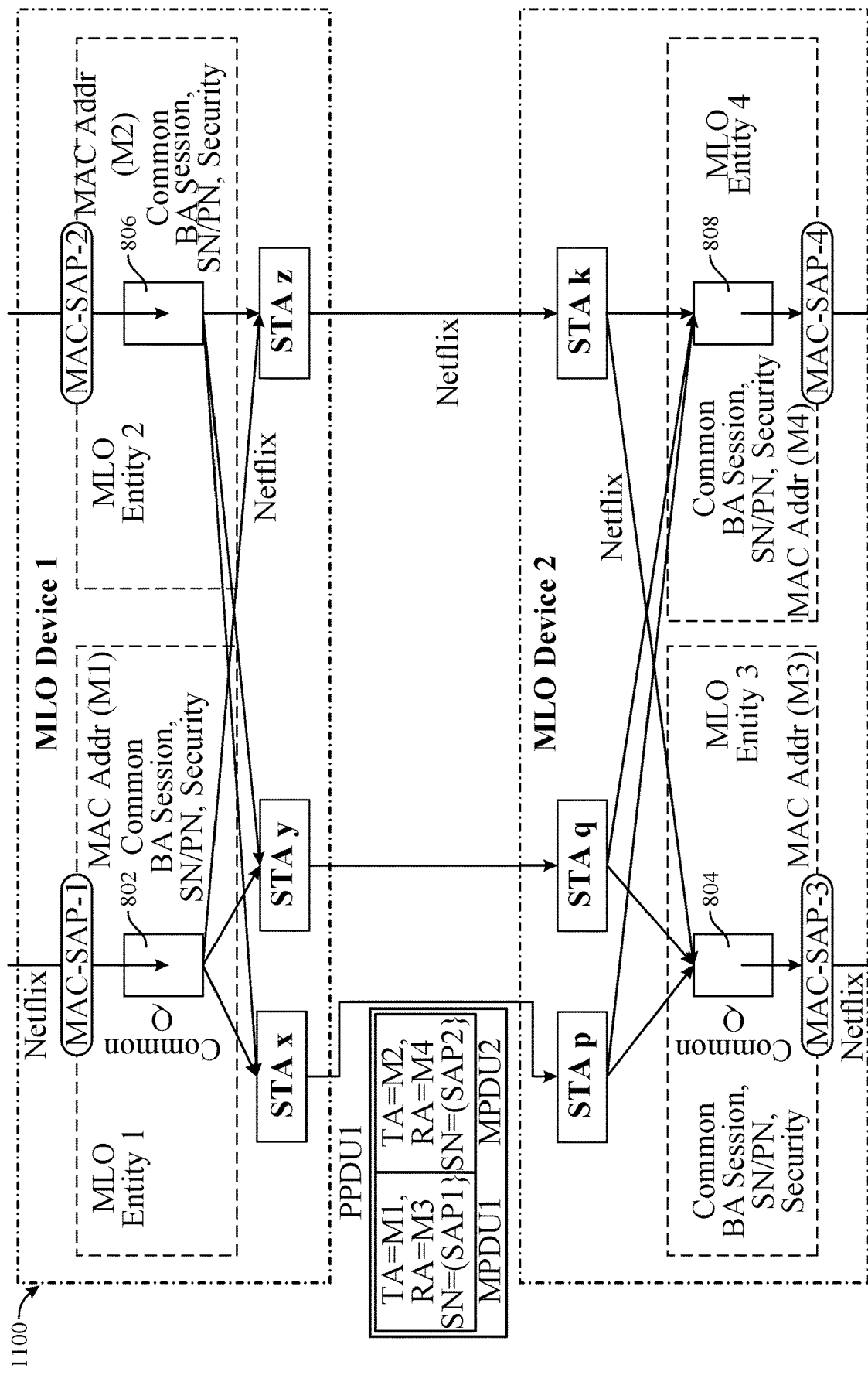
FIG. 11 illustrates a wireless communications system, in accordance with certain aspects of the present disclosure.

FIG. 11 illustrates a wireless communications system 1100, in accordance with certain aspects of the present disclosure. In this case, the wireless links are managed by the MLO device. A STA may act as a link interface to more than one MAC-MLO entity.

In other words, the MLO device manages all the available links. For example, the MLO device may indicate which MLO entity has access to which links for communications of specific TIDs, or packets within a packet sequence. For instance, data for a Netflix service may be obtained through MAC-SAP-1 of MLO entity 1, but directed to STA z for communications via the wireless link 3. At the receiver, the data for network service may be received by STA k and directed to MLO entity 3 based on the RA address indicated by the data.

In this case, an MLO device may generally refer to a logical entity that contains one or more STAs and is a collection of multiple MLO-entities. In other words, the wireless links are now a common pool of resources that are available to all MLO entities and the pool of resources are managed by the MLO device.

In certain aspects, different MPDUs transmitted on any link may be associated with different MLO entities, and therefore may have different TAs (such as set to the address of the originating MLO entity). For example, PPDU1 illustrated in FIG. 11 may have MPDU1 with a TA set to M1 if MPDU1 originates from MLO entity 1, and may have MPDU2 with a TA set to M2 if MPDU2 originates from MLO entity 2. In certain aspects, the MLO device may coordinate data flows such that all MPDUs of a PPDU belong to the same TA. For example, all PPDUs for Netflix service may be encoded such that all the PPDUs of the MPDU for the Netflix service have the same TA.

On the receive side, depending on the TA address, the STA knows which MLO entity the PPDUs are to be routed. Moreover, the appropriate BA scoreboard may be populated based on the TA of the MPDU. Since the MPDUs are between the same peers, the MCS for all MPDUs within a PPDU may be the same.

Figure 12:
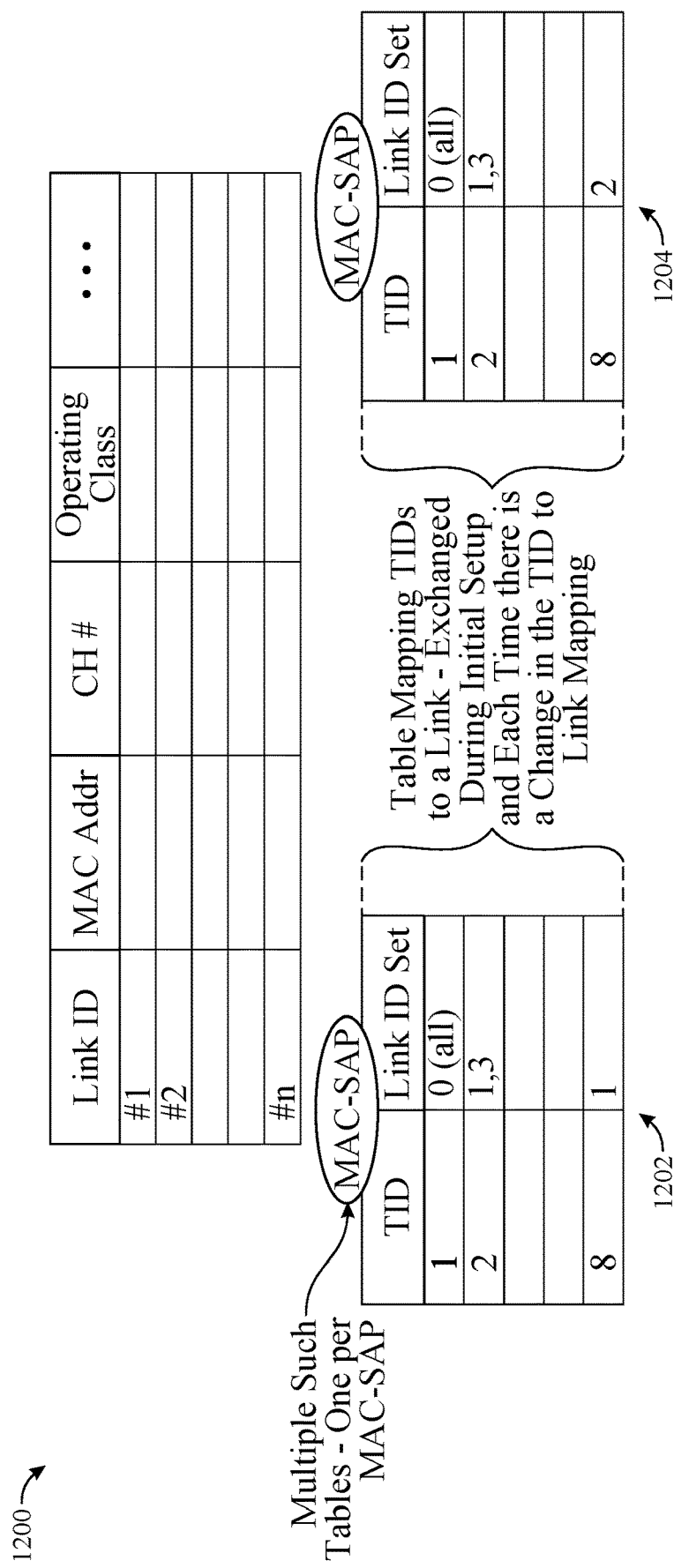
FIG. 12 illustrates tables for mapping of link identifiers to one or more parameters and mapping of TIDs to link identifiers, in accordance with certain aspects of the present disclosure.

FIG. 12 illustrates tables 1200, 1202 and 1204 for mapping of link identifiers to one or more parameters and mapping of TIDs to link IDs, in accordance with certain aspects of the present disclosure. As described with respect to FIG. 9, an MLO device that manages multiple MAC SAPs also manages the mapping of links to parameters (such as represented by tables 900, 902, 904) for each of the MAC SAPs. For instance, the table 900 illustrates the mapping of link IDs to a tuple of parameters associated with the link ID that uniquely identifies a corresponding link.

Table 1202 illustrates the mapping of TIDs to link IDs, similar to the mapping described with respect to table 902. As illustrated, one TID may be mapped to multiple links (such as links 1 and 3) (such as for packet aggregation). The mapping represented by table 1200 may be exchanged during an initial setup process of links. The mapping of TIDs to link IDs, represented by table 1202, may be exchanged during initial setup, as well as whenever a change to the mapping of TIDs to link IDs occurs. For example, as illustrated in table 1204, the mapping of TID 8 may be exchanged from link ID 1 to link ID 2. After this change occurring, the table 1204 may be exchanged to communicate this change.

Figure 13:
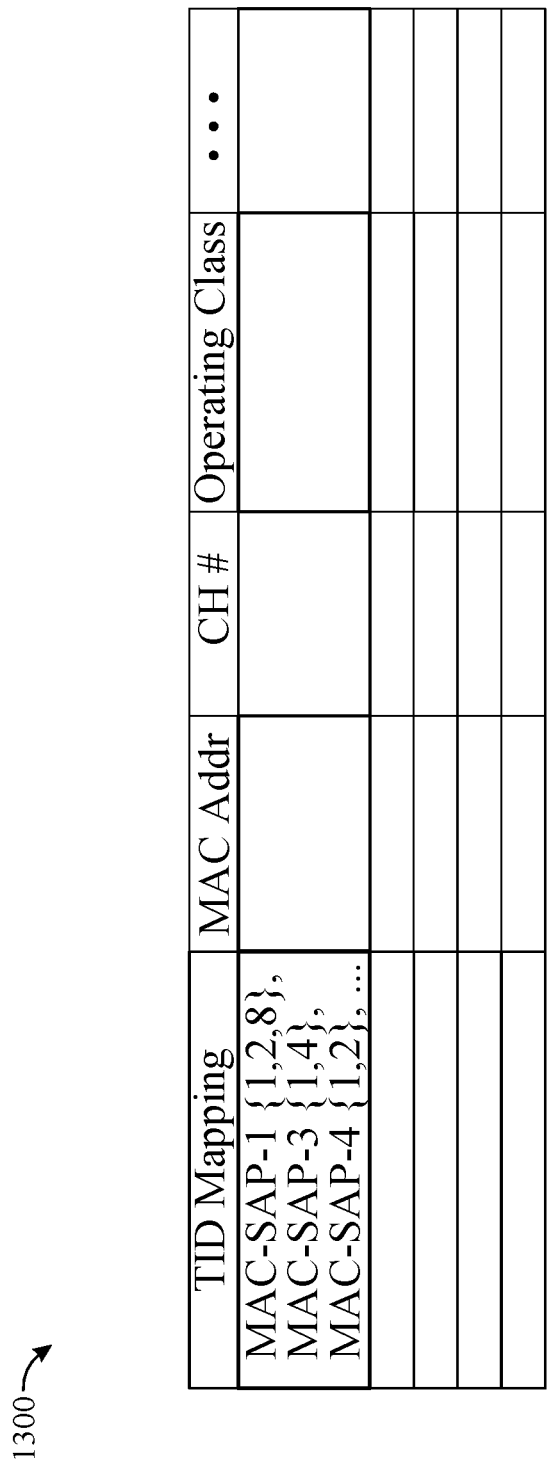
FIG. 13 illustrates table for mapping TIDs to parameters associated with a corresponding link, in accordance with certain aspects of the present disclosure.

FIG. 13 illustrates table 1300 for mapping TIDs to parameters associated with a corresponding link, in accordance with certain aspects of the present disclosure. In this case, TIDs are mapped to parameters associated with respective links. For example, the table 1300 maps TIDs 1, 2, and 8 to a specific MAC address, channel number, and operating class that represent a specific link. In other words, instead of exchanging explicit link IDs as described with respect to FIG. 12, one or more TIDs are indicated per MAC-SAP (MLO entity) as being supported by a specific link. That is, since signals from each link may originate from any MLO entity, both the corresponding MLO entity and the TIDs may be indicated for each link, as illustrated.

The various operations of methods described above may be performed by any suitable means capable of performing the corresponding functions. The means may include various hardware or software component(s) or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting (or means for outputting for transmission) may include a transmitter (such as the transmitter unit 222) or an antenna(s) 224 of the access point 110 or the transmitter unit 254 or antenna(s) 252 of the station 120 illustrated in FIG. 2. Means for receiving (or means for obtaining) may include a receiver (such as the receiver unit 222) or an antenna(s) 224 of the access point 110 or the receiver unit 254 or antenna(s) 252 of the station 120 illustrated in FIG. 2. Means for communicating may include a transmitter, a receiver or both. Means for generating, means for processing, means for obtaining and means for outputting may include a processing system, which may include one or more processors, such as the RX data processor 242, the TX data processor 210, the TX spatial processor 220, or the controller 230 of the access point 110 or the RX data processor 270, the TX data processor 288, the TX spatial processor 290, or the controller 280 of the station 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

As used herein, the term "determining" encompasses a wide variety of actions. For example, "determining" may include calculating, computing, processing, deriving, investigating, looking up (such as looking up in a table, a database or another data structure), ascertaining and the like. Also, "determining" may include receiving (such as receiving information), accessing (such as accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may include a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein include one or more steps or actions for achieving the described method. The method steps or actions may be interchanged with one another without departing from the scope of the claims. In other words, unless a specific order of steps or actions is specified, the order or use of specific steps or actions may be modified without departing from the scope of the claims.

The functions described may be implemented in hardware, software, firmware, or any combination thereof. If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a station 120 (see FIG. 1), a user interface (such as keypad, display, mouse, joystick, etc.) also may be connected to the bus. The bus also may link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may include packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, or a computer product separate from the wireless node, all which may be accessed by the processor through the bus interface. Alternatively, or in addition, the machine-readable media, or any portion thereof, may be integrated into the processor, such as the case may be with cache or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may include a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communications media including any medium that facilitates transfer of a computer program from one place to another. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (such as tangible media). In addition, for other aspects computer-readable media may include transitory computer-readable media (such as a signal). Combinations of the above should also be included within the scope of computer-readable media.

Thus, certain aspects may include a computer program product for performing the operations presented herein. For example, such a computer program product may include a computer-readable medium having instructions stored (or encoded) thereon, the instructions being executable by one or more processors to perform the operations described herein. In certain aspects, the computer program product may include packaging material.

Further, it should be appreciated that modules or other appropriate means for performing the methods and techniques described herein can be downloaded or otherwise obtained by a station or access point as applicable. For example, such a device can be coupled to a server to facilitate the transfer of means for performing the methods described herein. Alternatively, various methods described herein can be provided via storage means (such as RAM, ROM, a physical storage medium such as a compact disc (CD) or floppy disk, etc.), such that a station or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a multi-link operation device configured to generate at least one message indicating a mapping of each of a plurality of traffic identifiers (TIDs) to one or more parameters associated with each of a plurality of wireless links; and
    at least one interface configured to output the at least one message for transmission via at least one of the plurality of wireless links.

2. The apparatus of claim 1, wherein the multi-link operation device is configured to generate a beacon to be transmitted on each link of the plurality of wireless links, the beacon indicating information associated with a first basic service set identifier (BSSID) available on the link and a second BSSID available on the link, the at least one interface being configured to output the beacons for transmission.

3. The apparatus of claim 1, further comprising another multi-link operation device, wherein:
the multi-link operation device is configured to generate a first beacon to be transmitted on each link of the plurality of wireless links, the first beacon indicating information associated with a first basic service set identifier (BSSID) available on the link;
the other multi-link operation device is configured to generate a second beacon to be transmitted on the link, the second beacon indicating information associated with a second BSSID available on the link; and
the at least one interface is further configured to output the first beacons and the second beacons for transmission.

4. The apparatus of claim 1, wherein the one or more parameters comprise at least one of an address associated with the multi-link operation device, a channel number associated with the wireless link or an operating class associated with the wireless link.

5. The apparatus of claim 1, wherein the at least one message comprises:
a first message indicating a link identifier associated with each of the plurality of wireless links, the link identifier indicating the one or more parameters; and
a second message indicating the mapping of each of the plurality of traffic identifiers to at least one of the link identifiers.

6. The apparatus of claim 1, wherein the multi-link operation device is further configured to generate a sequence of packets, and wherein the at least one interface is further configured to output the sequence of packets for transmission via at least one of the plurality of wireless links.

7. The apparatus of claim 6, wherein:
the at least one interface is configured to output the at least one message for transmission to a wireless node;
each packet of the sequence of packets comprises an address associated with the multi-link operation device of the apparatus; and
each packet of the sequence of packets comprises another address associated with a multi-link operation device of the wireless node.

8. The apparatus of claim 6, wherein the at least one interface is configured to:
output a first packet of the sequence of packets via a first wireless link of the plurality of wireless links, and
output a second packet of the sequence of packets via a second wireless link of the plurality of wireless links.

9. The apparatus of claim 6, wherein each packet of the sequence of packets is associated with a different packet number value from a common pool of packet number values.

10. The apparatus of claim 6, wherein:
the sequence of packets is one of a plurality of sequences of packets;
the multi-link operation device is further configured to generate the plurality of sequences of packets;
the at least one interface is configured to output the plurality of sequences of packets for transmission via at least one of the plurality of wireless links; and
each of the plurality of sequences of packets is associated with a different sequence number value from a common pool of sequence number values.

11. The apparatus of claim 6, wherein an encryption key associated with each packet of the sequence of packets is the same regardless of which of the plurality of wireless links the packet is to be transmitted.

12. The apparatus of claim 6, wherein the multi-link operation device is further configured to generate another message requesting acknowledgement of the sequence of packets, the at least one interface being further configured to:
output the other message for transmission via a first wireless link of the plurality of wireless links; and
obtain the acknowledgement via a second wireless link of the plurality of wireless links.

13. The apparatus of claim 1, wherein:
each of the plurality of wireless links is associated with a different association identifier (AID); and
the indication of the mapping of each of the plurality of traffic identifiers to the one or more parameters associated with each of the plurality of wireless links comprises indicating the AID corresponding to the wireless link supported by each of the plurality of traffic identifiers.

14. The apparatus of claim 13, wherein the at least one message comprises a message indicating that data traffic is expected for communication on another wireless link of the plurality of wireless links, and wherein the indication comprises a bit of the message corresponding to the AID for the other wireless link.

15. The apparatus of claim 1, wherein:
the multi-link operation device is one of a plurality of multi-link operation devices of the apparatus, each of the plurality of multi-link operation devices being associated with a different association identifier (AID); and
the indication of the mapping of each of the plurality of traffic identifiers to the one or more parameters associated with each of the plurality of wireless links comprises indicating the AID corresponding to a respective one of the plurality of multi-link operation devices associated with each of the plurality of traffic identifiers.

16. An apparatus for wireless communications, comprising:
at least one interface configured to:
obtain, from a wireless node, at least one message via at least one of a plurality of wireless links indicating a mapping of each of a plurality of traffic identifiers to one or more parameters associated with each wireless link of the plurality of wireless links; and
obtain, from the wireless node, a sequence of packets associated with at least one of the plurality of traffic identifiers via one or more of the plurality of wireless links; and
a multi-link operation device configured to process the sequence of packets based on the mapping indicated via the at least one message.

17. The apparatus of claim 16, wherein the at least one interface is configured to obtain a beacon on each link of the plurality of wireless links, the beacons indicating information associated with a first basic service set identifier (BSSID) available on the link and a second BSSID available on the link, wherein the multi-link operation device is configured to communicate with the wireless node based on the first BSSID or the second BSSID.

18. The apparatus of claim 16, wherein the at least one interface is configured to obtain a first beacon and a second beacon on each link of the plurality of wireless links, the first beacon indicating information associated with a first basic service set identifier (BSSID) on the link and the second beacon advertising a second BSSID available on the link, wherein the multi-link operation device is configured to communicate with the wireless node based on the first BSSID or the second BSSID.

19. The apparatus of claim 16, wherein the one or more parameters comprise at least one of an address associated with a multi-link operation device of the wireless node, a channel number associated with the wireless link or an operating class associated with the wireless link.

20. The apparatus of claim 16, wherein the at least one message comprises:
a first message indicating a link identifier associated with each of the plurality of wireless links, the link identifier indicating the one or more parameters; and
a second message indicating the mapping of each of the plurality of traffic identifiers to at least one of the link identifiers.

21. The apparatus of claim 16, wherein:
the at least one message comprises a message indicating the mapping of each of the plurality of traffic identifiers to the one or more parameters associated with each of the plurality of wireless links; and
the at least one message further indicates a mapping of each of the plurality of traffic identifiers to an address associated with a multi-link operation device of the wireless node.

22. The apparatus of claim 16, wherein:
each packet of the sequence of packets comprises an address associated with the multi-link operation device; and
each packet of the sequence of packets comprises another address associated with a multi-link operation device of the wireless node, the processing of the sequence of packets being further based on the address and the other address.

23. The apparatus of claim 16, wherein the at least one interface is configured to:
obtain a first packet of the sequence of packets via a first wireless link of the plurality of wireless links, and
obtain a second packet of the sequence of packets via a second wireless link of the plurality of wireless links.

24. The apparatus of claim 16, wherein each packet of the sequence of packets is associated with a different packet number value from a common pool of packet number values, the processing of the sequence of packets being further based on the packet number values.

25. The apparatus of claim 16, wherein:
the at least one interface is further configured to obtain a plurality of sequences of packets via at least one of the plurality of wireless links, the multi-link operation device being configured to process the plurality of sequences of packets; and
each of the plurality of sequences of packets is associated with a different sequence number value from a common pool of sequence number values, the processing of the plurality of sequences of packets being based on the sequence number values.

26. The apparatus of claim 16, wherein an encryption key associated with each packet of the sequence of packets is the same regardless of which of the plurality of wireless links the packet is obtained, the processing of the sequence of packets being further based on the encryption key.

27. The apparatus of claim 16, wherein:
the at least one interface is further configured to obtain another message requesting acknowledgement of the sequence of packets via a first wireless link of the plurality of wireless links;
the multi-link operation device is further configured to generate an acknowledgement message in response to obtaining the other message; and
the at least one interface is further configured to output the acknowledgement message for transmission via a second wireless link of the plurality of wireless links.

28. The apparatus of claim 16, wherein:
each of the plurality of wireless links is associated with a different association identifier (AID); and
the indication of the mapping of each of the plurality of traffic identifiers to the one or more parameters associated with each of the plurality of wireless links comprises an indication of the AID corresponding to the wireless link supported by each of the plurality of traffic identifier.

29. A wireless node, comprising:
a multi-link operation device configured to generate at least one message indicating a mapping of each of a plurality of traffic identifiers to one or more parameters associated with each of a plurality of wireless links;
at least one interface configured to output the at least one message; and
at least one transmitter configured to transmit the at least one message via at least one of the plurality of wireless links.

30. A wireless node, comprising:
at least one receiver configured to:
obtain, from a wireless node, at least one message via at least one of a plurality of wireless links indicating a mapping of each of a plurality of traffic identifiers to one or more parameters associated with each wireless link of the plurality of wireless links; and
obtain, from the wireless node, a sequence of packets associated with at least one of the plurality of traffic identifiers via one or more of the plurality of wireless links; and
a multi-link operation device configured to process the sequence of packets based on the mapping indicated via the at least one message.

* * * * *